United States Patent
Bhatia et al.

(10) Patent No.: US 7,437,312 B2
(45) Date of Patent: Oct. 14, 2008

(54) METHOD FOR CONTEXT PERSONALIZED WEB BROWSING

(75) Inventors: Rajesh Bhatia, Mountain View, CA (US); Nikhil Ganju, Mountain View, CA (US); Anil Kamath, Palo Alto, CA (US); Prashant Kulkarni, Sunnyvale, CA (US); Phoumrin Tan, San Jose, CA (US)

(73) Assignee: Bizrate.com, Los Angeles, CA (US)

( * ) Notice: Subject to any disclaimer, the term of this patent is extended or adjusted under 35 U.S.C. 154(b) by 1013 days.

(21) Appl. No.: 09/933,861

(22) Filed: Aug. 20, 2001

(65) Prior Publication Data
US 2002/0154162 A1 Oct. 24, 2002

Related U.S. Application Data

(60) Provisional application No. 60/227,558, filed on Aug. 23, 2000.

(51) Int. Cl.
G06Q 30/00 (2006.01)
(52) U.S. Cl. .............................. 705/26; 705/1; 705/27
(58) Field of Classification Search ................... 705/26, 705/27, 1
See application file for complete search history.

(56) References Cited

U.S. PATENT DOCUMENTS

| | | | |
|---|---|---|---|
| 5,794,259 A | 8/1998 | Kikinis | |
| 5,903,728 A * | 5/1999 | Semenzato | 709/217 |
| 5,961,593 A | 10/1999 | Gabber et al. | |
| 5,983,200 A * | 11/1999 | Slotznick | 705/26 |
| 5,983,220 A | 11/1999 | Schmitt | |
| 6,076,166 A | 6/2000 | Moshfeghi et al. | |
| 6,088,700 A | 7/2000 | Larsen et al. | |
| 6,138,139 A * | 10/2000 | Beck et al. | 709/202 |
| 6,192,380 B1 | 2/2001 | Light et al. | |
| 6,199,079 B1 | 3/2001 | Gupta et al. | |

(Continued)

OTHER PUBLICATIONS

M. Hiro, G. Kondoh, K. Ono, Annotation-Based Web Content Transcoding, publication date unknown, downloaded from Internet Apr. 26, 2001.*

(Continued)

*Primary Examiner*—Jeffrey A. Smith
*Assistant Examiner*—Jason B. Dunham
(74) *Attorney, Agent, or Firm*—Ganz Law, P.C.

(57) ABSTRACT

Computer software, systems and methods for providing context personalized browsing over computer networks. In the foregoing, an intelligent agent referred to as a "browser companion agent" includes a service component for holding one or more service modules that may assist a user by providing services that are contextually relevant to content on a browser on the user's computer system. The agent also includes a data component for holding data objects related to and sharable by one or more service modules. The agent further includes a tracking component for tracking the pages on a browser and for communicating browser page data to a remote computer system that may respond to the agent with data or code for use by service modules. Contemplated service modules include a comparison shopping service, a transaction tracking service, and automated form filling service.

14 Claims, 14 Drawing Sheets

U.S. PATENT DOCUMENTS

| | | |
|---|---|---|
| 6,247,029 B1 | 6/2001 | Kelley et al. |
| 6,266,058 B1 * | 7/2001 | Meyer ........................ 715/733 |
| 6,341,306 B1 * | 1/2002 | Rosenschein et al. ....... 709/217 |
| 7,277,919 B1 * | 10/2007 | Donoho et al. .............. 709/206 |
| 2002/0059395 A1 * | 5/2002 | Liou .......................... 709/217 |
| 2003/0158792 A1 * | 8/2003 | Perkowski ................... 705/27 |
| 2005/0192870 A1 * | 9/2005 | Geddes ........................ 705/26 |
| 2005/0251458 A1 * | 11/2005 | Perkowski ................... 705/26 |

OTHER PUBLICATIONS

Office Action response filed in divisional U.S. Appl. No. 11/313,552, on Apr. 28, 2008, 30 pages.

* cited by examiner

METHOD FOR CONTEXT PERSONALIZED WEB BROWSING

This invention claims the benefit of U.S. Provisional Application No. 60/227,558, entitled "Browser Companion Architecture", filed Aug. 23, 2000, the entire disclosure of which is hereby incorporated by reference as if set forth in its entirety for all purposes.

BACKGROUND OF THE INVENTION

1. Field of the Invention

This invention relates to accessing data over computer networks, and more particularly, to accessing information on the Internet, or World Wide Web (Web) with a personalized browser system. In one embodiment, the information relates to enhancing ecommerce functionality.

2. Background Art

Access to information on the Web is typically accomplished by invoking a program known as a Web browser. The browser acts as an interface between the user and the Web, accepting input from the user and obtaining data and services by sending requests to servers or other computers at other locations on the Web, and retrieving and displaying documents or pages from the Web. FIG. 1 illustrates this scheme. Primary examples of commercially available browsers include Microsoft Internet Explorer and Netscape Communicator. Many traditional services and business transactions are now carried out over the Web in this manner, and ecommerce has become a critical activity for businesses and consumers.

Although filled with valuable information and services, the Web is often difficult and time consuming to use with current browsing technology. In many ways, accessing the Web resembles the outdated mainframe network model with the browser playing the role of dumb terminal: much of the information needed is locked up in centralized databases, served up one page at a time to individual users who must know and remember where the information is that they are looking for.

To improve Web usage, search engines, such as Google™ and Altavista™ have been created to provide a more effective means for users to locate information on the Web. Browsers also include functionality to assist a user in relocating information by storing URLs for user-selected Web pages. This simplifies the user's future access to these bookmarked Web pages.

However, these improvements provide helpful features but are inadequate. Search engines are not personalized to a user and require a user to enter effective queries for accurate results. Moreover, searching for information through a browser requires a user to go to a separate search page to enter each query. A user must return to this search page to run subsequent queries. Moreover, standalone Web sites create islands of functionality and data that are not transportable across the Web. A user must manually navigate between sites and interfaces, which often involves repetitively logging in or form filling at each site and entering the same information repeatedly, such as inputting personal contact data, credit card data, etc. Attempts have been made to provide automatic form filling. These are reflected in Kikinis, U.S. Pat. No. 5,794,259 entitled Apparatus And Methods To Enhance Web Browsing On The Internet; Gupta et al., U.S. Pat. No. 6,199,079 entitled Method and System for Automatically Filling Forms In An Integrated Network Based Transaction; Environment; Light et al., U.S. Pat. No. 6,192,380 entitled Automatic Web Based Form Fill-In; Kelley et al., U.S. Pat. No. 6,247,029 entitled Web Browser Form Enhancements; and Larsen et al., U.S. Pat. No. 6,088,700 entitled Automated Forms Completion For Global Information Network Applications. The foregoing patents are incorporated herein in their entireties for all purposes.

Accordingly the state of the art is such that there still is inadequate real interactivity between a user and the Web sites or other network sites accessed through a browser. Users must directly act on information, rather than setting intelligent preferences that then automatically act on the user's behalf. Users are increasingly demanding such advanced functionality integrated with other functionality to automate and streamline a user's web experience. The other functionality may include online search systems that provide more personalized or context relevant results; online shopping information systems that provide users with personalized or context relevant information; systems for storage of user profiles and preferences; systems for tracking, storing, and retrieving of records and information related to users' online transactions; and systems for automated data entry into online forms and data entry fields.

SUMMARY OF THE INVENTION

The present invention addresses the foregoing needs by providing a new paradigm of context personalized browsing. In this paradigm, in addition to the conventional browser (e.g. Internet Explorer) and the Web server (e.g., that of a merchant such as www.amazon.com), there is a novel software agent, referred to herein as a "Browser Companion Agent or "BCA" for short. The BCA is associated with a conventional, main browser on a client system (which may be referred to herein as the "main browser". Among other things, the BCA assists a user by hosting and orchestrating one or more services that are relevant to information accessed through the main browser. The BCA assists users in a number of ways, for example, to shop faster and smarter by providing "what to buy", "where to buy" and "how to buy" services. It also displays messages based on user navigation and states merchant related information. It also may assist in automated online form filling. It also may be used to maintain records of a user's online transaction. The BCA is designed with a novel modular architecture so that the addition or deletion of services available through the BCA is readily facilitated.

DETAILED DESCRIPTION OF THE INVENTION

General Overview of Features

Figure 1:
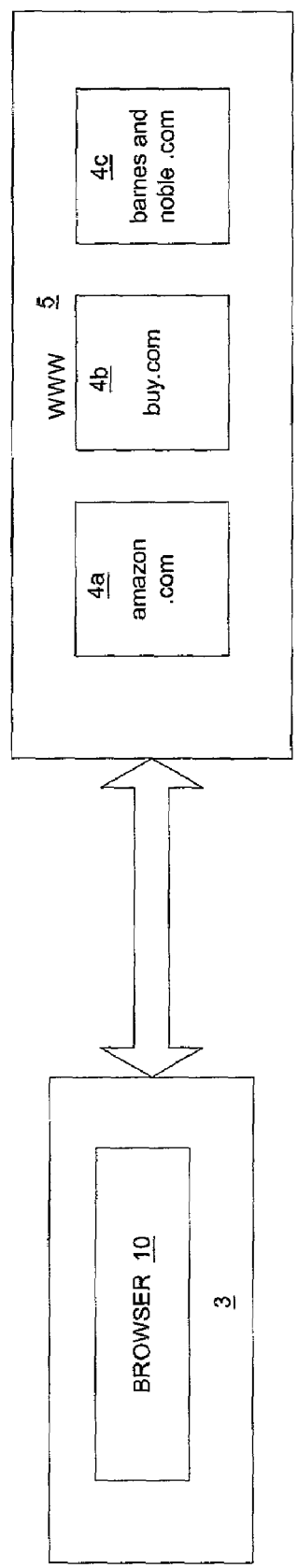
FIG. 1 shows the prior art scheme for web browsing.

1. Browser Companion Agent:

The agent that orchestrates contest personalized browsing on a host system. The agent sits inside or is otherwise coupled to a "content browser", which could be a standard web browser, a browser for an e-book system, etc. The content browser provides access to content, and the BCA monitors the content which is provided by the browser. The BCA resides on the host or client machine, which most often would be, a computer being used to "surf" the web. This agent might take the form of a COM object executing within Internet Explorer.

2. Tracker Object

This object is used by the BCA to monitor the content in the browser. Requirements for this object include notification of changes in browser content. Effectively this object listens to the browser for changes in content and delegates processing to other objects depending on what the content is. This object resides on the host machine. This object may be implemented inside of the BCA object as another COM object.

3. Proxy Object

This object is used by the BCA to modify content sent back to the browser component. If the Tracker object determines that certain content requires a certain type of processing, the proxy object manages transfer of other content into the BCA object for assistance with this processing. This object resides on the host machine. This object may be implemented as a COM object which provides network services to other COM objects.

4. Type-and-learn (TAL) Object (For Use in Connection with an Optional Automated Form Filling Service Module)

This object resides on the remote machine, unlike most of the other objects. It maintains a registry of all the communication made by the BCA on a host machine. Depending on the interactions and content provided to this object, the TAL object modifies its internal state, to improve services provided by the RSC (below). This object could take the form of a database with user profiles correlated to websites visited by those users.

5. Remote Services Code (RSC) Object (Implemented Under Application Service Providers, Discussed Below)

The RSC object is a server-side code which acts, based on the user, what content is being viewed, state parameters, and possibly other factors, sends back the appropriate correlating code and/or data to the BCA. The code often will correlate to a specific service module for the BCA 6. Code Assistance Objects These are pieces of executable code that are sent back by the RSC in order to assist with browsing sessions. The code often will correlate to a specific service module for the BCA. They are customized depending on the state of the service, and customized depending on the user accessing the objects. These objects will often take the form of JavaScript code. These objects are produced on the RSC and sent over to be received and executed in the BCA. An example implementation of these objects would be JavaScript source files as text.

Detailed Discussion of Features

The systems, methods, and features of the present invention may be implemented through a networked computer system, such as a personal computer on the Internet. As person skilled in the art will appreciate from the teachings herein that the novel Browser Companion Agent ("BCA") of the present invention may be implemented through a variety of software protocols, platforms, or environments. For the sake of illustrating its salient features, the present invention is generally described in terms of implementation of C++ programming language in connection with an Internet Explorer browser. However, this is intended to be a non-limiting example, the appended claims defining the scope of the invention.

The present invention is intended for use with a content browser such as a web browser or e-book browser. Also for non-limiting purposes of illustration, the present invention is generally discussed in terms of a conventional web browsers, such as Microsoft Internet Explorer or Netscape Communicator, using known standards and protocols applicable to a browser system. For example, the standards and protocols for implementing the present invention in an Internet Explorer or Netscape Navigator are known to persons skilled in the art and are freely available from providers of browser systems, for example.

MSDN Online Web Workshop: "Creating Custom Explorer Bars, Tool Bands, and Desk Bands"; MSDN "Browser Helper Objects: The Browser the Way You Want It", available through Microsoft's online technical library at http://msdn.microsoft.com/library; and Netscape's DDE (Dynamic Data Exchange) Implementations: http:/developer.netscape.com/docs/manuals/communicator/DDE/abtdde.htm The BCA uses a novel architecture that can display information related to a browser's content. The BCA monitors content pages being viewed by a user in a main browser window and determines the content or subject and can display related information about the page, such as news, products, specials, discounts, and comparison information and pricing. As a matter of architecture, the agent may be a thin client composed of objects. In one possible embodiment, the BCA has certain common components that may be shared by multiple service modules to enable services (e.g., purchase tracking, form filling, etc.) Each service may rely on the common components to execute their specific functionality. In one possible embodiment of BCA architecture, the BCA is modularly composed of Component Object Model (COM) objects. New objects representing services can be added incrementally or existing services can be enhanced to offer additional functionality through the novel architecture of the BCA.

The BCA can also store personal information of a user and automatically fill this information into pages that request it. It may also store other information related to a user's online activities. For example, it can be used to store information related to an online transaction, such as an order confirmation.

Due to the relatively limited resources of most client systems, the BCA works in conjunction with a central server to deliver services to users of the client systems with BCAs. For example, the BCA, through a Tracker Object (discussed in detail below), receives related data or information from a central server after the BCA sends data about a specific page on the client system's main browser. The server uses this data from the page to determine the subject or context of the page. Once this is determined, the server may send related information to the BCA from its database or other resources. For example, if a user is looking at a purchase form of an online merchant, for example, Amazon.com, the BCA sends relevant data (e.g., domain, user identity) to the server, which then returns the domain specific information such as name-value pairs, form filling scripts, personal data of a user, so the BCA can automatically fill in the form. For efficiency, a user's personal data is retrieved only once from the server during a session. As another example, the page could contain information on products the user may be interested in purchasing. The page could be parsed by the server or the client for the product data, the data may be used by the server to return comparison product information to the user.

The server functions noted above may be associated with or included as part of an infomediary Web site. Generally, an "infomediary" provides information about products and merchants; maintains information about user shopping profiles or preferences; provides buyers access to online merchants; and/or otherwise facilitates transactions between online buyers and sellers. One such infomediary is BizRate.com (www.bizrate.com), the assignee of the present invention. The server functions of the present invention could also be implemented through other online service providers such as Web portals, or any other Web site operator. Bizrate.com may be used herein as the example Web site from which Internet users could download the software for the BCA and who would provide data and applications used in the systems of the present invention.

Figure 2:
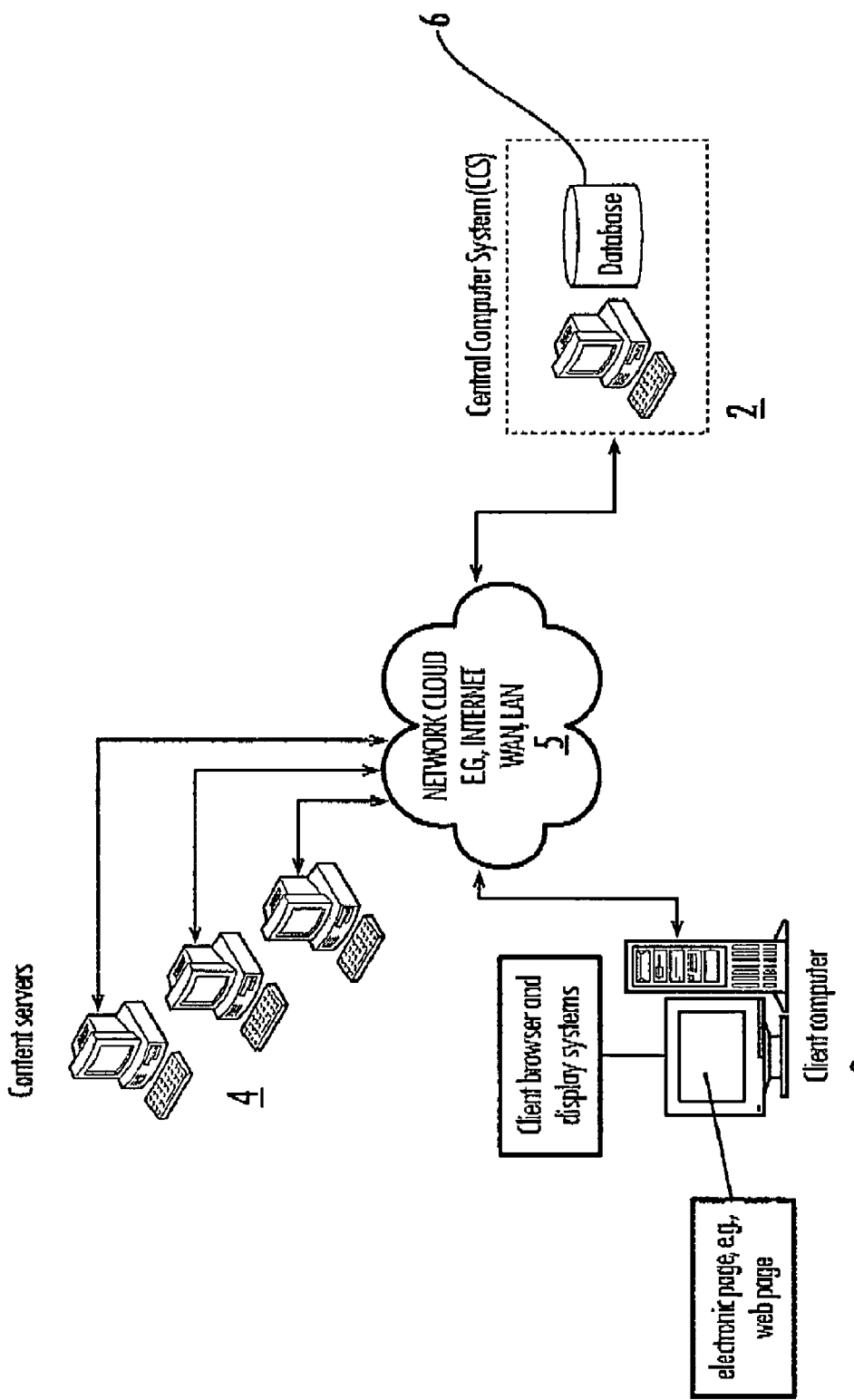
FIG. 2 is a schematic illustration of a general system of networked computers for implementing embodiments or aspects of the present invention.
Figure 3:
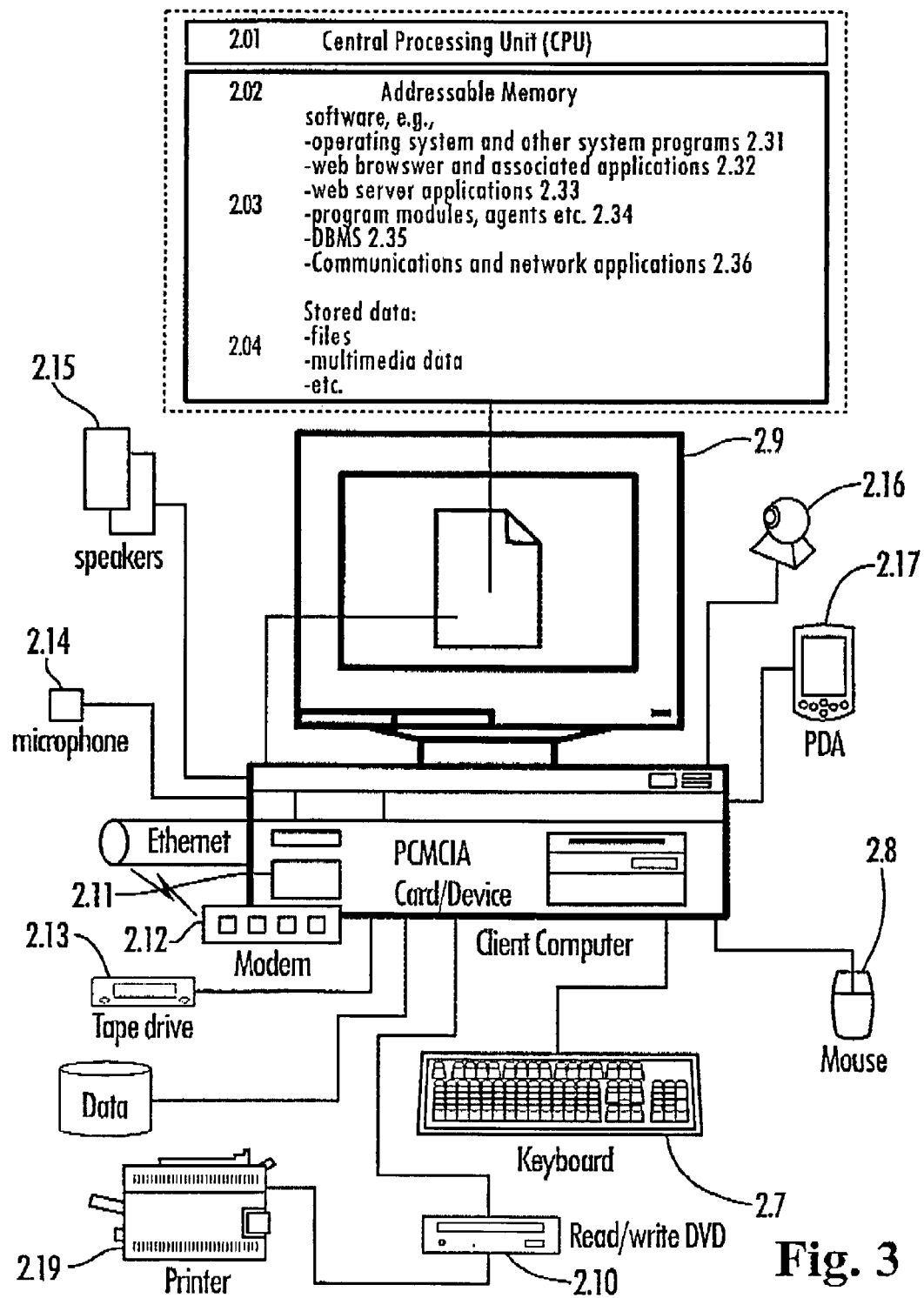
FIG. 3 is a schematic illustration of general features of a computer system that may used in implementing embodiments or aspects of the present invention.

The methods of the present invention may be stored in or implemented through computer readable media associated with a single computer system or a distributed computer system. Looking more particularly at the systems and methods for implementing the present invention, FIG. 2 shows an overview of a system 1 of a plurality of networked computers, according to the present invention. System 1 includes a Central Computer System ("CCS") or central server 2, one or more consumer or client computer systems 3, a plurality of content provider computer systems 4, such as may be controlled by online merchants. The CCS computer system would typically be an infomediary's computer system and would execute one or more features of the present invention. For example, as discussed below, it may include a server with downloadable BCAs; it may update BCAs installed on client computers; it may serve data or code to a client computer in connection with the operation of a BCA on the client computer; it may provide new service modules for installation in a BCA on a client computer; it may store personal data or transactional data for user's of client computer systems with BCAs; it may provide ecommerce and shopping assistance services to users of client computer systems; and/or it may provide security and authentication services to client computer systems. Computer systems in system 1 may be networked over LANs, WANs, VPNS, the Internet or other known network systems using known protocols for such systems, including TCP/IP.

FIG. 2 illustrates features that may be typically found in a computer system 2, 3, or 4 in system 1. As used herein a "computer system" generally means a set of hardware and software components as is known in the art. A computer system 2, 3, or 4 generally includes: central processing unit ("CPU") 2.01; memory (ROM and RAM) 2.02, e.g. a hard disk drive and associated RAM devices; programs 2.03 in memory, including operating system 2.31, web browser applications 2.32 and/or web server applications 2.33, user applications (modules or agents) 2.34, database management system (DBMS) 2.35, communications and network applications 2.36, e.g., email, and network interface systems. Memory 2.02 would also include stored data 2.04.

A computer system may include one or more of the following input/output devices: keyboard 2.7, mouse 2.8, display monitor 2.9, read/write drive 2.10 for removable media, e.g., DVD drive, PCMCIA card 2.11, modem 2.12, backup storage device 2.13, e.g., tape drive, audio capture device 2.14, e.g., microphone, audio output device 2.15, e.g., stereo speakers, still or motion image capture device, e.g., camera 2.16, and an associated computer device for data upload or download, e.g., PDA 2.17, and/or a printer 2.19.

It will be understood by persons skilled in the art that a computer system 2, 3, or 4 may also be in the form of a Personal Digital Assistant (PDA), a wireless computer system or device capable of communications over the Internet or other network, or a computer terminal (thin client) or Internet appliance capable of such network communications.

A computer system 2, 3 or 4 in system 1 may be in the form of a distributed system not, under a single housing or roof, but having the distributed components logically coupled and under the operational control of a party.

Computer systems of system 1 may execute a conventional operating system 2.31, including, but not limited to, Microsoft Corporation's Windows (sm) 3.x, 95, 98, 2000, ME, NT or DOS operating systems; Linux operating systems; Sun Microsystems' Unix Solaris operating systems; IBM's AIX Solaris operating systems; SGI's IRIX Solaris operating systems, Apple OS, BE OS or other operating systems, including, but not limited to Window's CE, Palm OS, etc. for PDAs, cellular devices, web devices, or other computing devices. The possible software components of a computer system 2, 3 or 4 described herein, including operating system and application software, may reside on one or more hardware components providing addressable memory for the computer system.

Data and information may be formatted by a party's computer system for printing, viewing, transfer to another computer system, storage in any of many known formats, including, Adobe PDF; rich text (RTF); SGML formats including HTML, DHTML, XHTML, and XML; ALLAIRE Cold Fusion CFML; MICROSOFT ASP; JAVA Script MICROSOFT Word, Excel, Access; bitmap, JPEG, GIF, and other graphics file formats. It could also be presented in known audio or video formats such as WAV, MPEG, and MP3 formats.

The electronic data file may be served via known protocols, such as TCP/IP, and formatted in known formats of standardized mark up languages such as HTML and XML. Web documents generally means electronic documents that may be presented through conventional web browser applications such as the INTERNET EXPLORER series of web browser applications by Microsoft Corporation, or the NETSCAPE COMMUNICATOR series of web browsers by Netscape Communications Corporation. As used herein, "client" means a computer system that makes a request to or receives fulfillment of a request from another computer system. "Server" means a computer system that receives and/or fulfills a request from another computer system. Also, as used herein the term "computer system" may be used interchangeably with "computer", "computing device", "machine", "system having computational resources" or like terms.

A computer system 4 executing features of the present invention may include various external interface applications for converting incoming data, such as form data, to a format for communication with the respective application module or database. The system may also include various external service modules for obtaining information in a format required by the external service. The system may also include a notification module. This module handles notification and electronic mail communication with client systems. The system may include a database interface module. This module handles all interface requirements between application modules and the databases. For example, the database interface application manages (a) the simultaneous connections to the database such that the total number is maintained within applicable license agreements; and (b) any integrity problems in interactions between application modules and the databases. Thus, this module allows the system to be connected to different types of databases such as relational databases or object-oriented databases. Another function that may be included in the system is a consumer profile/settings module. This module receives the consumer profile and settings data sent to the system and performs intake operations on the data so that it may be used in other modules or assigned to databases.

The present invention contemplates that different parties may create and manage database records, input and manage data, upload files, communicate, compute data, collaborate, and exchange things with each other through their respective computer systems. The data and files may be transferred or presented to computer systems by participating parties via user interfaces developed in Standardized General Markup Languages (SGML), scripting languages, and other known languages or protocols. Such languages and protocols include MICROSOFT ASP, CFML, JAVASCRIPT, JAVA, COM, CGI, HTML, DHTML, XHTML and/or XML. To provide the foregoing functionality, the user interfaces would typically be in the nature of electronic documents such as web documents or email documents that, through appropriate computer code from such languages, are associated with databases, web servers, web browsers, file servers, network communications links, email programs, etc. The electronic documents could be static documents stored on a server or database or documents created dynamically through server function calls, for example.

Databases may be based on any number of known DBMSs, including hierarchical databases, network databases, relational databases, and object-oriented databases. Suitable DBMSs are widely available and include Oracle, Sybase, Microsoft SQL Server, open source MySQL, and DB2. One suitable database system is a relational database based on Structured Query Language (SQL). A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine and can be accessed by various querying means, including Boolean logic evaluation, proximity calculations, and fuzzy logic evaluation. The search engines and databases of the present invention may also be custom designed, the design process and features being well within the skill of persons in the art. U.S. Pat. No. 5,983,220 of Schmitt, entitled "Database Evaluation System Supporting Intuitive Decision in Complex Multi-Attributive Domains Using Fuzzy, Hierarchical Expert Models" discloses, among other things, systems and methods for constructing and querying databases and returning and presenting results of database queries. The '220 patent is hereby incorporated by reference for all that is disclosed therewithin as if set forth herein in its entirety.

The computer systems suitable for use may include or otherwise be directly associated with a web server and associated database. As used herein, a web server generally refers to a computer system that hosts software that enables access by remote computer systems or terminals via the Internet or other network transport. The web server may permit one or more of the following: presentation of data and information, typically in the form of web documents or streaming media; data and information storage and transfer; and other transactions or processes that are capable through web servers. Suitable web server software is widely available and includes Apache Software Foundation's Apache Server web server; Netscape's FASTTRACK series web server, Microsoft Corporation's Internet Information Server, IBM's WebSphere, and Sun Microsystem's JAVA WEB SERVER. A web server in CCS 2 may run appropriate scripts to capture data, to process captured data, or to present processed data. A web server of CCS 2 may receive into or present data from an associated database or other data source to remote computer systems 3, 4, or other remote system, over a network 5. The data may be presented in any known format or mechanism, including HTML, XML, PDF, CFML, MICROSOFT ASP, and as graphic, audio, video and multimedia formats, and others.

The foregoing embodiments and features are for illustrative purposes and are not intended to be limiting persons skilled in the art capable of appreciating other embodiments from the scope and spirit of the foregoing teachings. As a general note, in the text and figures, the portion of referenced components and objects given as " . . . eB . . . " or " . . . eBoodle . . . " is an arbitrary designation used to designate a component or object ("eBoodle") described herein. For example, "CeBObject" is a Browser Helper Object (BHO), as noted below. The present invention provides novel applications for BHO technology, although BHO technology is generally known in the art. See, for example, Semenzato, U.S. Pat. No. 5,903,728 entitled Plug-In Control Including An Independent Plug-In Process; Meyer, U.S. Pat. No. 6,266,058 entitled Apparatus And Method For Linking Browser Bars With Active Documents For A Browser, the entire disclosures of which are hereby incorporated by reference as if set forth in their entireties for all purposes.

FIG. 1 shows the conventional (prior art) model for web browsing. A browser 10 of a client computer system 3 could communicate with web servers 4a, 4b, and 4c of different parties. In this example the client computer system is operated by a consumer and the web servers are operated by online merchants, at domains such as amazon.com 4a, buy.com 4b or barnesandnoble.com 4c.

Figure 4:
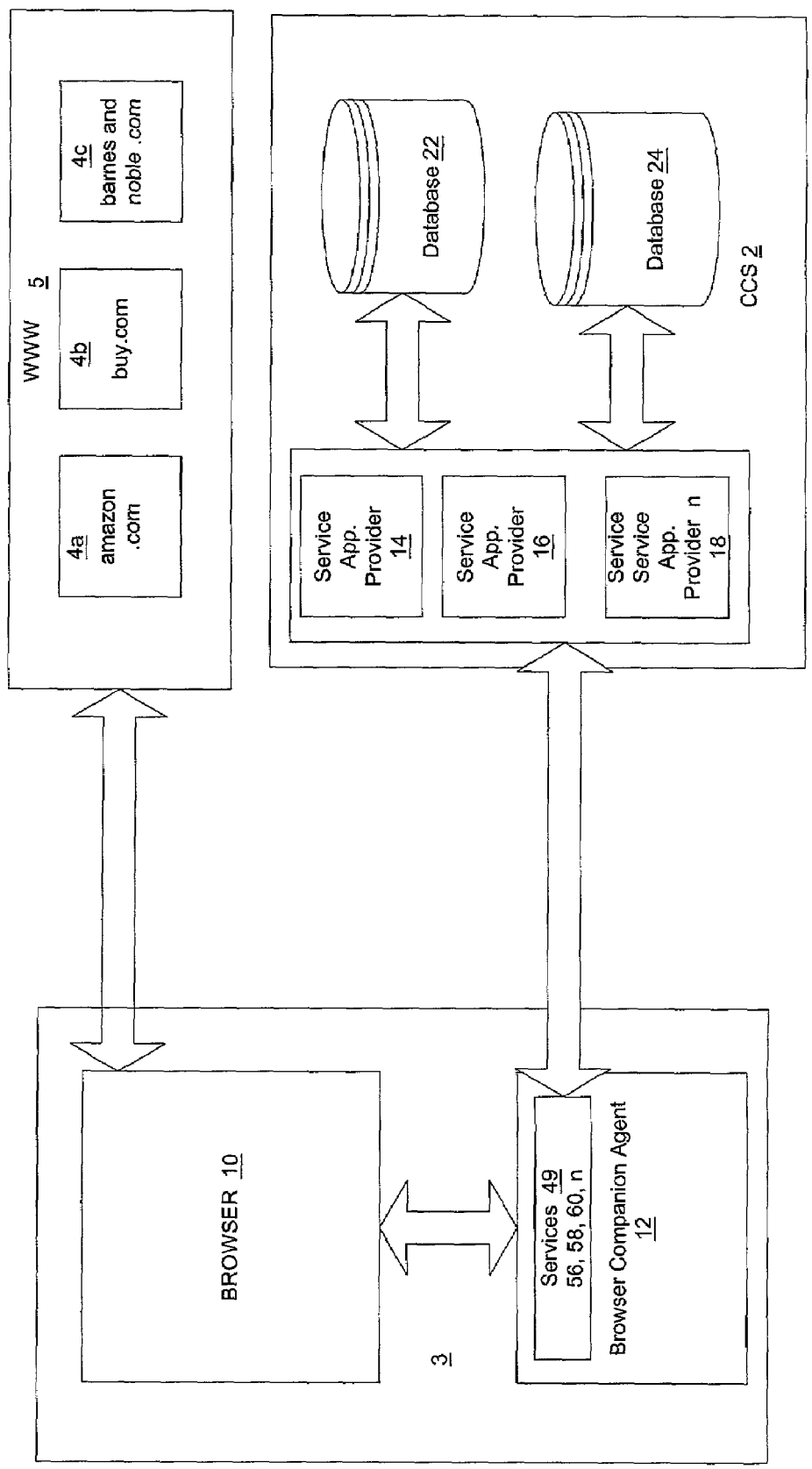
FIG. 4 is a block schematic showing a general overview of system for context personalized browsing, in accordance with the present invention.

FIG. 4 describes a novel embodiment of a system for context personalized browsing according to the present invention. In the embodiment shown, client 3 includes a BCA 12 associated with a browser 10. The BCA communicates with the browser. It may also communicate with a remote computer systems such as a CCS 2. The BCA monitors the pages being seen by a user on the browser window to determine the browsing context. The BCA then sends information about the browsed page to the server. The server uses this information about the browsed page to determine the context. The server can avail itself of data stored in the database. It may also go to other resources, such as the Web to seek relevant information needed in providing assistance. The server uses these resources to provide the BCA with pages, scripts and data that the BCA uses in services to enhance the browsing experience. For example, if a user is looking at a form within the domain of amazon.com, the BCA sends the information (domain, user identity) to the server, which then returns the site specific name-value pairs, form filling scripts, personal data of a user, etc. so that the BCA's automated form filling service can fill the form.

In a preferred embodiment, CCS 2 includes certain applications that may communicate with the BCA 12 and/or browser 10. For example, as indicated in FIG. 4, the CCS may include a comparison shopping search application 14; a "wallet" application 16 that maintains personal data of users of client 3 and enables use of the data in online transactions with third party sites such as 4a, 4b, and 4c; and/or a transaction tracking application 18 that acquires and maintains records and information related to online transactions by the user of a client system. These are example applications or services. It should be appreciated that there may be service additions or deletions depending on the preferences of a system administrator or designer. Databases may be associated with the applications, as needed. For example, database 22 could be used to store data used by comparison shopping search engine 14. The data categories could include products by category, product features, product prices, product availability, etc. Database 24 could be associated with the wallet application 18 and/or transaction tracking application 18. The data categories used by these applications may include user name, address, credit card number, merchant name, merchant receipt, etc.

Figure 5:
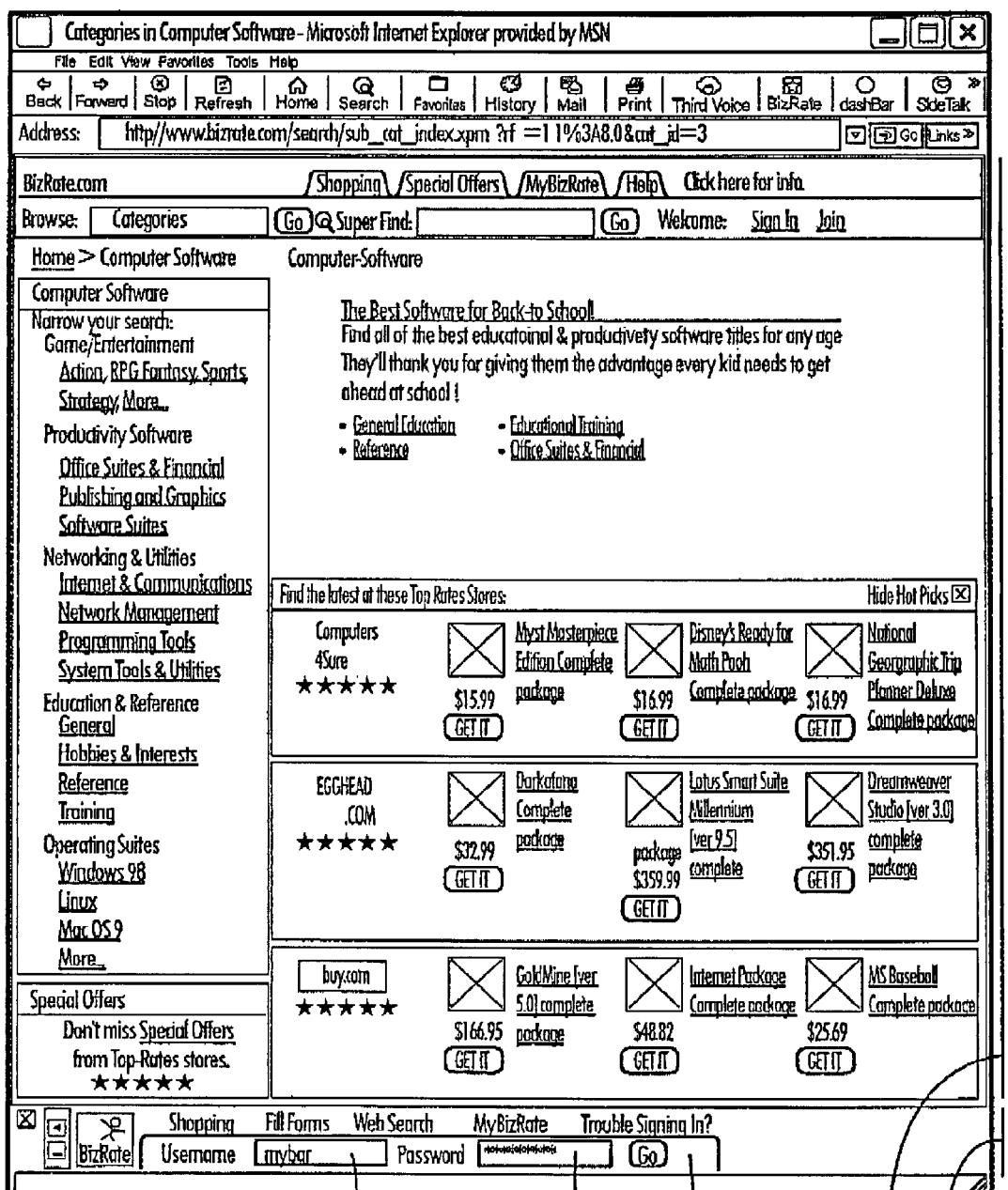
FIG. 5 shows an example user interface associated with a main browser, in accordance with the present invention.

Looking at FIG. 5, the interaction between a user and the services provided by or through the BCA may be coordinated through a user interface ("UI") 26. In this example, the BCA UI is a thin docked window or bar 26 associated with a main browser window 28. The BCA UI preferably provides a display area 29 adjacent to the browser pane. It may be a child window within the browser window, and it can be used to display information and interact with the user in much the same way as a main browser. The BCA UI may occupy any desired area of a computer display. The bar is not limited to the size or positioning of that shown. Generally, the BCA UI would occupy a small area of the display so that it is subordinate to a main browser. Further, more than one BCA UI may appear at a time for different services. Using standard programming techniques, the BCA UI may be configured to change proportionally with a user's changes to the size of a main browser window 28. It may also be configured to be moveable over a display screen.

The BCA UI may display HTML, other SGML based pages, and other browser displayable pages related to BCA services and also provide input areas and controls that a user can invoke to get specialized assistance. For example, in a transaction-tracking service, the BCA window 29 could display the cash-back earned when a user buys an item through an infomediary's website. As another example, in form-filling service mode, a user could use the input areas 31, 33 of the window to change the credit-card that is used to buy the item. In connection with a shopping service, the bar advantageously may provide an interface for a shopping service that allows a user to quickly and easily search from any website location on the main browser, without returning to a search home page to begin another search.

Figure 6:
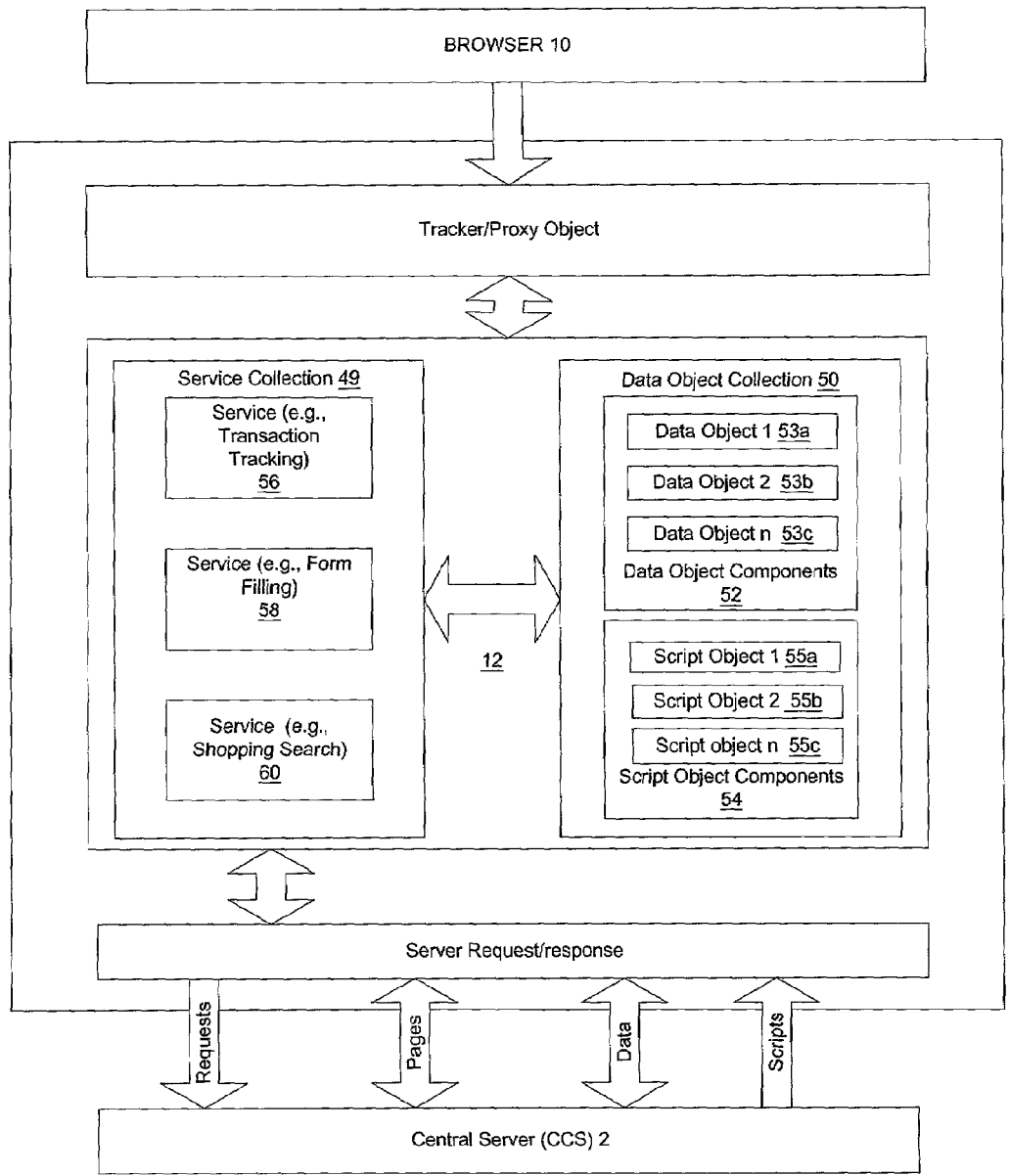
FIG. 6 is a block schematic showing a general overview of the architecture of a browser companion agent for use in a system for context personalized browsing, in accordance with the present invention.
Figure 7:
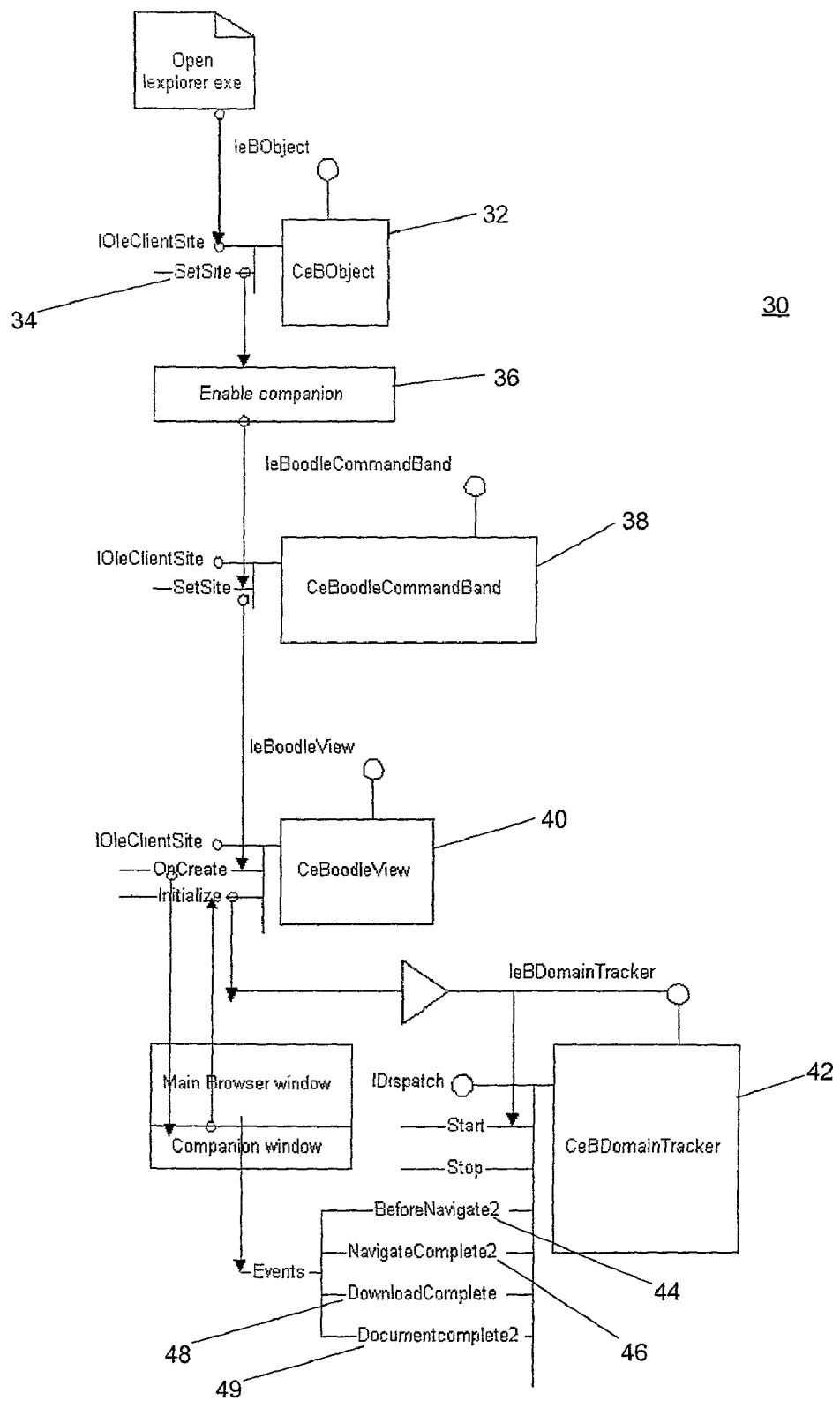
FIG. 7 is a diagram chart that illustrates objects and related features, according to an embodiment of the present invention.

FIGS. 6-7 show one possible embodiment of a scheme 30 of objects and data flow associated with service modules 56, 58, 60 for a BCA 12. The BCA may be adapted to start on initiation of a browser, for example, Internet Explorer. A Browser Helper Object (BHO) is initiated in a session by a remote computer, such as the CCS. Upon initiation, the BHO reads a client-side index of functionality that may be called upon by the BCA. In the case of a Microsoft Windows environment, the BHO would read the client system's registry. For example, in FIG. 8, BCA objects, functions, calls, and events are generally illustrated. The class name for the BHO 32 is CeBObject. On every new instance, the browser calls 34 CeBObject::SetSite method and passes a handle to the main browser. The BHO reads the client system's registry to determine the need to auto launch 36 the BCA. This registry setting is a persistent user preference of launch state and the companion is launched if the auto launch state is enabled to be on.

On the launch of a BCA, CeBoodleCommandBand::Setsite method is called by Internet Explorer. The parameter passed to this method is an indirect interface to the browser object. The class CeBoodleCommandBand 38 stores this interface in a global interface holder and creates an instance of View class control. The View class control is CeBoodleView 40 which embeds a BHO. The View class creates the browser objects and shows the index page. This index page calls the initialization method from within the HTML. The initialization method creates the Tracker object and calls the Start method.

The Tracker object tracks and monitors the browser window (which may also be referred to as the "Host") to determine an identifier for the location of content on the browser. For example, in the case of a web browser, the identifier would be the domain, e.g., URL, of content on an associated main browser window. TheTracker object has the logic to detect a change of page in the window. The Host includes facilities to notify or provide queried access to change content in the host display. For example, if a user navigates from a current web page to another, the Tracker detects the change between pages. FIG. 6 illustrates an example of a class object CeDomainTracker 42 that maintains a collection of BCA services. The Tracker object is created by the View object and is started by calling the Start method. This method does the following:

In this example, the Tracker object uses a "listener interface" to receive automatic notification of page changes from the Host. For example, it connects to the main browser object to receive events from the browser, using the IconnectionPoint interface.

Verifies in the Host environment whether there are services to be performed. For example, the Tracker object looks at a list of services on a remote machine (e.g., CCS2) and compares the list to a locally maintained list to determine what services or other functions to perform. In the Microsoft environment, there is a scan of registered services, examining the machine registry under HKEY_LOCAL_MACHINE\SOFTWARE\EBOODLE\eBsvcs and loop for all the class identifier (CLSID) found and a check if the CLSID belongs to CATID_EboodleService and passes an authentication check. On matching of the criteria above, the service is created and inserted in the list. There are multiple key and value pairs for registry HKEY_LOCAL_MACHINE\SOFTWARE\EBOODLE\eBsvcs, and are filled by a script. For example, the script may be JavaScript in an HTML file that is executed once for the entire session in the View class.

The MainBrowserProxy object is used to set the registry. The keys may be a sequence of numbers beginning from 1 and values are CLSIDs for every number. The key value pair represent the sequence in which the services should be created and called by the Tracker. The CATID_EboodleService is an interface defined as a standard and which may be implemented by all services. In this way, the Tracker may communicate with all services using a common set of Application Program Interfaces (APIs).

The Tracker waits for the browser to call back on an event. The events may be predefined. For example, in the case of BHOs, Microsoft has various defined events, and the Tracker adheres to the specified rules and guidelines for such events. The Microsoft BHO events which the Tracker may respond to include one or more of the following:

BeforeNavigate2 (User has expressed interest in content, but the user's machine has not communicated the interest to another machine with the content page)

Navigatecomplete2 (After communication has started, but not necessarily before the communication is complete)

Downloadcomplete (Once download is complete, but before display to user)

Documentcomplete2 (Download complete and page displayed)

In the example of FIG. 6, the modularity of the BCA is shown. BCA 12 includes service collection 49 and data object collection 50. Data object collection 50 includes a collection 52 of one or more data component objects 53 consisting of data objects and/or a collection 54 of one or more script component objects 55. Data objects 53 may be provided to hold data for use in services 56, 58, 60 associated with a BCA. The Script Objects 55 may be provided to store a collection of scripts that are sent by a server and used by the BCA in providing specific services. Since these scripts are dynamically generated by the server and made available to the agent service providers, this is an advantageous way of adding new or modifying existing services, without a fresh install of the agent. New data structures with corresponding scripts can be added to the agent to reflect changes to websites that users visit, to provide enhanced services, or to otherwise update data for use by a service. Advantageously, since user specific data will typically be server resident, it is not machine dependent.

For example, regarding a form filling service (described below), the data could relate to details of a Web page on a main browser. For example, each Web page can contain frames or no frames and each page or frame can contain one or more forms. Each form can consist of one or more elements. Frame details, information about forms and form properties contained on the page or in a frame can be contained in a data object. For convenience, unless context indicates otherwise, the term "page" shall mean page, frame, or other discrete browser displayable element. The script object components 55 may be used to instruct the client system relative to data in a data object or to implement service features that can use or interface with the scripts. In the case of both the script objects and data objects, common interfaces may be provided so that multiple service modules may access any given data or script object in Data Object Collection 50.

Figure 8:
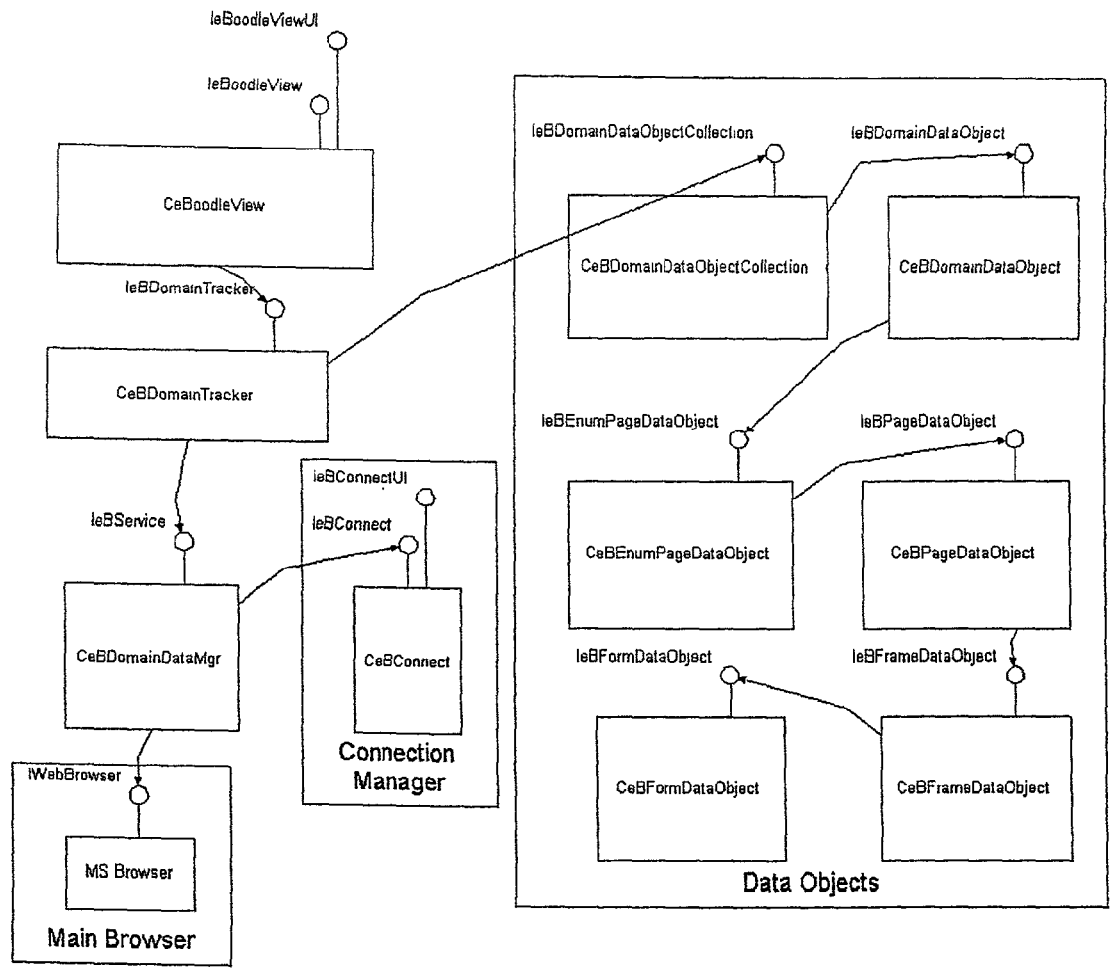
FIG. 8 is a diagram that illustrates objects and related features, according to an embodiment of the present invention.
Figure 8:
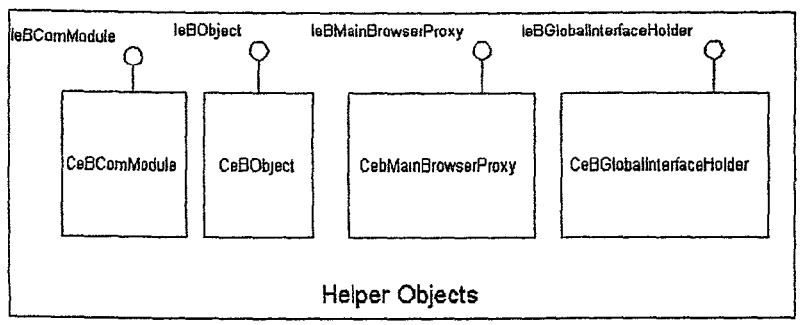

Looking at FIG. 8, to store a generic page structure in the memory, the following data objects may be required:

Form Data Object: CeBFormDataObject contains a map of key value pairs which represents the form element name and value.

Frame Data Object: CeBFrameDataObject contains a collection of form data objects Page Data Object: CeBPageDataObject contains a collection of frame data objects.

Collection of Page Data: CeBEnumPageDataObject contains a collection of page data objects.

Site Data Object: Complete data for a site resides in this data object. CeBDomainDataObject contains a collection of page data and a map of key value pairs. A portion of the generic data about the site is stored directly in this data object since it does not belong to any page. For example, the assignee of this patent document maintains on its website systems various categories of information for online merchants. The information categories include, for instance, consumer ratings data for various online merchants, merchant group rating (e.g., gold, silver, etc.), merchant participation in rebate programs, etc. The data representing such information may be stored in CeBDomainDataObject.

Collection of site data Object: CeBDomainDataObjectCollection object keeps a collection of data for 'n' sites, where 'n' can be maximum size set in the object. On addition of a new item, the Least Recently Used (LRU) technique is used to figure out which item needs to be associated with the new one. A logical site can belong to multiple domains. For example, www.shades.com uses www.cartserver.com for a checkout process, and the data for the shades and cartserver Web sites is the same. The collection object contains two entries: one for shades as key and one for cartserver as key. The value object for these two keys is the same pointer and hence the same memory location. On addition of a new site data object, the total items in the list is compared with the threshold, which is set using registry entry and can be modified as needed. If the total is greater than the threshold, then iteration through the list is performed to get the least recently used site. The list is again iterated to get all aliases for the site that is the least recently used and the site and aliases are then deleted from the list for a new site to be entered.

Figure 9:
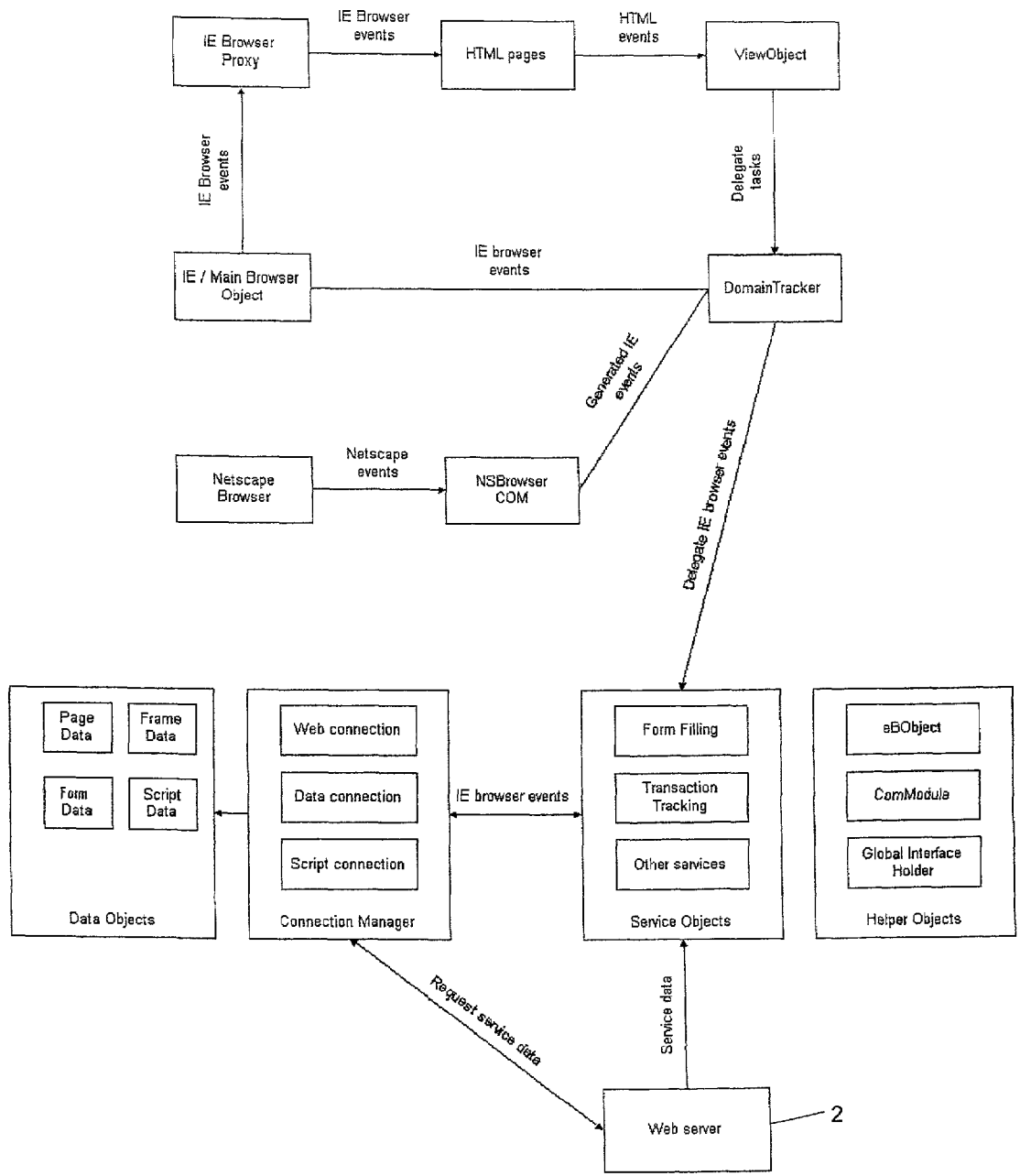
FIG. 9 is a diagram chart that illustrates objects and related features, according to an embodiment of the present invention.

FIG. 9 shows the interaction between different components of the BCA. The BCA may be comprised of C++, JavaScript and HTML code. The components are View, Tracker, and BHOs. All of these communicate with each other and have access to data on a need basis. For example, scripts such as JavaScript, in the services have access to data stored in the memory, access to main browser object, etc. The main browser object is a core component of Internet Explorer and is needed by all the components. The BCA may access to the main browser object by using a BHO or a "band object. The object is stored in a global interface holder, one of the helper objects described below. The other helper object is a Browser Proxy Object.

Helper Object Components

Browser Proxy component: CebMainBrowserProxy acts as a proxy for the main browser. The objects expose APIs to get the main browser object, registry access, communicate between a web site and the companion. For example, when a user goes to a site to change his or her personal profile (e.g., to update addresses and credit cards), the message is sent to the BCA via the browser proxy component.

Global object holder component: CeBGlobalInterfaceHolder is a singleton object, which can be used to make an object globally available. An object needs to be registered with the global object holder. The holder may be instantiated anywhere in the same process and is used to get access to registered objects.

The View component object: The View object is the presentation component that embeds a BHO to render HTML pages. It also provides APIs to persist JavaScript variables in memory so that they are available from one page to the other. For example, state messages are saved in the memory so that when a user navigates from one tab to another, the messages are not lost. On every new page download in the View, if it exists, the stored message is displayed. The View object also provides a communication channel between a user action on HTML and services.

Server Request Gateway

The Server Request Gateway 62 interfaces between service providers and the server. On one hand, it routes requests, data and pages from the service providers to the server. On the other, it interprets server input and stores the scripts received from the server in the script collection object, the data in the data collection object. Related pages or information may be displayed in the BCA UI or the browser.

Server Architecture

The CCS 2 or server side has an API for interfacing with the BCA 12. The server receives requests, data and pages from the agent and sends data, pages, and scripts back to the agent. In one possible embodiment, the server architecture has certain components that may be shared by a variety of application service providers for providing services. Examples of application service providers are provided below. New application service providers can be added that use the shared components to offer new services to a user.

Database

One component of the server architecture may be a database. The database generally stores at least two kinds of data—profile information about a user and domain specific information about sites a user may visit through a browser on the client computer associated with a user. Domain data may be URLs or other addresses of pages viewable through a browser. User profile data helps in the personalization and the domain-specific data is used for contextual information that can be shared by all the application service providers.

Search Engine

The server architecture may also include a search engine that can access websites and obtain data to populate databases or data objects associated with BCAs on client systems. Preferably, the search engine is a multi-threaded search engine that can go across the Web concurrently to multiple sites on demand and obtain desired pages from sites. The multi-threaded engine manages the streams of data that are received from the threads and passes them on to, for example, databases, service modules associated with BCAs, or other data users.

Data Extraction Engine

The server architecture also may include a data extraction engine for extracting information from Web pages retrieved by the search engine, from a client machine, or other source. The data extraction engine uses parsing modules and parsing libraries to assist in the extraction of the relevant information.

Parsing Modules

To extract data from a page, the page needs to be modeled to understand its underlying structure and the information that it represents. The parsing modules may be individually written for each domain and each page type based on the page model and the information that needs to be extracted. The data extraction engine uses these parsing modules to extract desired information. The modules and the data extraction engine may use a library of commonly used methods that are shared and serve as a repository of domain independent parsing functionality.

Application Service Providers

As noted above, the server architecture may include application service providers that enable the various service modules associated with BCAs on client systems. The architecture of the present invention advantageously provides the flexibility to allow additions and modifications of services over time. The application service providers can avail themselves of several important components like the data extraction engine, the search engine and/or the database in interpreting the data sent by the BCA and in providing the agent with tools for context personalized browsing. The applications can also leverage the models that have been developed for the different page types at different stores.

The Services

The present invention contemplates various services, including automatic form filling; transaction tracking; comparison shopping, context-related-messaging, automated hyperlinking and information retrieval (see U.S. patent application Ser. No. 09/881,353, which is incorporated by reference below); presentation to consumers of online offers, the offers being determined by the content on a user's browser or the users interaction with the content; searching service that directs information to a user dependent on the users browser content or interaction with the content; searching service that monitors information keyed by the user into a search interface; chatting service that allows users to chat with each other, for example users with a common page on their browsers could be enabled to chat with each other; buying power service that monitors for common interest in content page about a product or service and provides discounts or other offers to users based on a collective level of interest. The modular architecture of the present invention provides a convenient and efficient architecture for including any one or more the foregoing services or any other service that can be dependent on the context of content on a users browser. In addition to implementing services individually, services may be implemented jointly. For example, Form filling and Transaction Tracking service may be implemented as one service. This service creates three internal connections to the server using the BHO. The connections hold the data, JavaScript logic for a single site, and user.

The services provide specialized functions to a user in connection with a user's browsing activities. The Tracker and the BCA UI interface with the services through the BCA services interface. The service providers may use a Server Request Gateway at the other end to communicate with the server. They also have access to the collection of Script and Data Objects. Each service module may be a COM object that a client computer may download from the server and plugged in to the BCA where they are available until they are uninstalled. Some examples of services:

Domain-Data Manager

The Tracker invokes the Domain-Data Manager service on every browser page. It communicates with the server to get relevant data and scripts needed to fill the forms. The data is stored in the data collection object and used by other services. This service only deals with data maintenance, and hence other services do not have to do the same.

Automated Form-Filling

The Tracker invokes the form-filling service when the browser is at a form. It uses domain data collection to get relevant data and scripts needed to fill the forms. For specialized services like changing the credit card used in the transaction, the service provider can use scripts from the Script Collection object. (A more detailed discussion of the form-filling service is discussed below).

Transaction Tracking

The transaction tracking service provider recognizes and sends the transaction related pages to the server while a user is purchasing an item. The server extracts the transaction information, stores it for future referral and uses it to compute the cash back.

The foregoing services are for example purposes only and are not intended to limit the range of services that may be provided through the BCA. Other service providers can be added, as desired. For additional example, other services could include a site listing service that provides a list of sites related to the domain where a user is browsing; a newsgroups or surveys service that provides newsgroups or surveys related to the content of the page being displayed; a comparison shopping or pricing service that prices an item on a web page or provides comparison shopping information. Comparison shopping information could include price of the same item at other stores or competitive alternatives to the particular item. The input for the comparison shopping search engine could be implemented by parsing a web page on a browser for keywords or elements that match predetermined keywords or elements in a database. More details of such a system are provided in commonly assigned U.S. patent application Ser. No. 09/881353, filed Jun. 12, 2001, entitled "Systems And Methods For Automatic Hyperlinking Of Words Or Other Data Items And For Information Retrieval Using Hyperlinked Words Or Data Items", the entire disclosure of which is hereby incorporated by reference for all purposes.

Automated Form Filling Services

Conventional online forms are not associated with any kind of intelligent application for comprehensive and accurate form filling. Because the fields in forms presented from one Web site to another often call for the same data, users are faced with repetitive and time-consuming data input tasks. The form filling service of the present invention generally relates to the automated input of data into fields or forms or other means for receiving data that may be presented to users of a computer network such as the Internet. The present invention particularly relates to client and server applications that enable automated form filling for online shopping.

In one possible embodiment of automated form filling, knowledge of a form's structure may be developed manually or through a "network effect" of obtaining the necessary data for form filling. In other words, knowledge of the structure of a given form may be obtained by monitoring the actions of a plurality of users filling out the form manually. Once sufficient knowledge is obtained, the relevant data on the forms structure may be sent to the form filling module associated with a BCA. The network effect system accordingly is based on having users participate in an online program that supports automated form filling. When more users visit particular sites, the system will "learn" more about that site, such as the form names, form control data, etc., and subsequently apply this learned information in form filling for other users.

System Introduction:

The automated form filling process involves two parts: identifying (1) what to fill, and (2) where to fill a user's information. The "what to fill" for a particular user is provided by a user when he or she registers on a Web site sponsoring automated form filling. The kind of information that can be provided includes names, addresses, birth dates, social security numbers, phone numbers, fax numbers, email address, and any other kind of information for form fields. The form filling module uses this information and populate the specific site variables for actual form filling.

Figure 10:
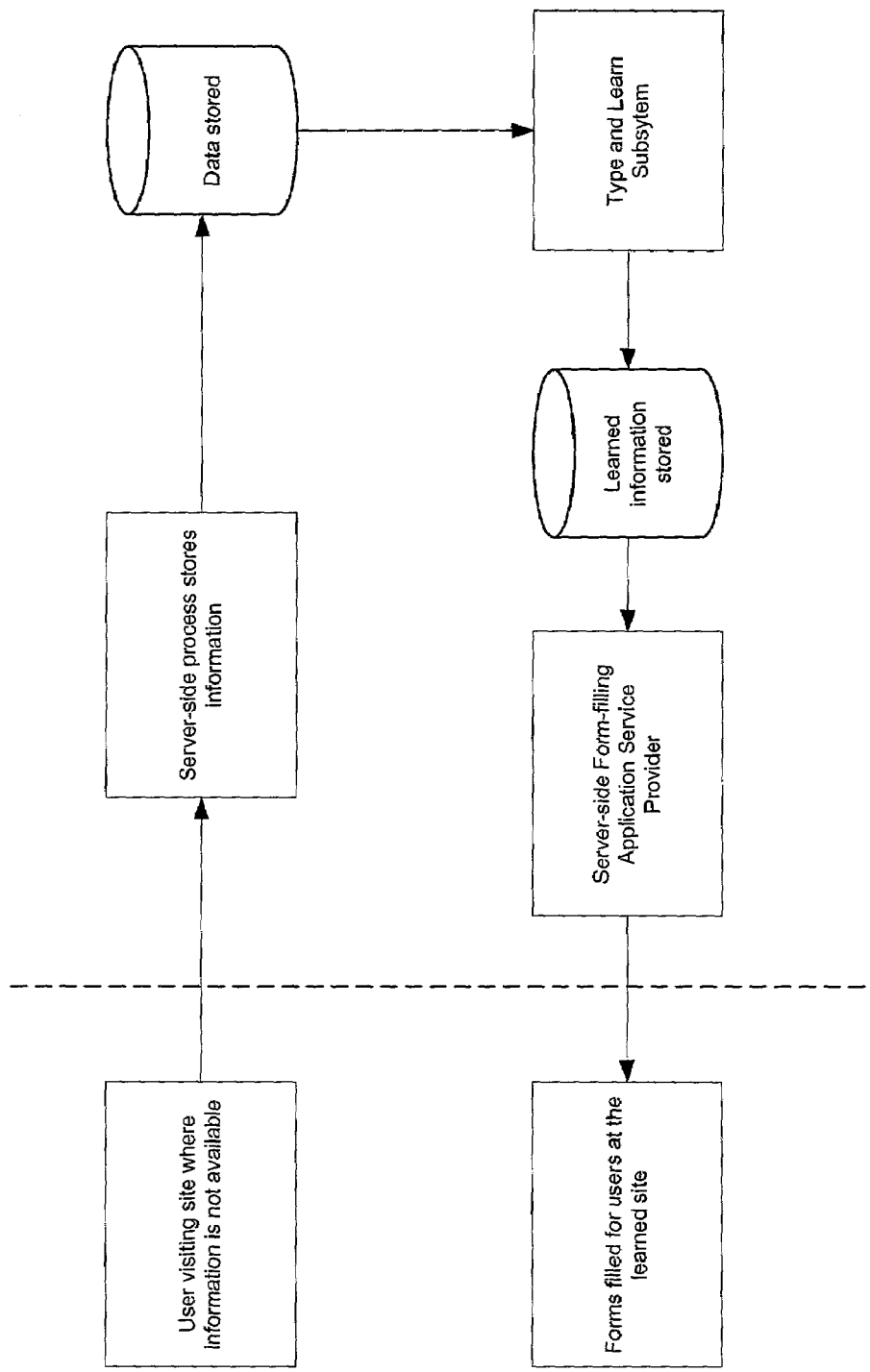
FIG. 10 is a diagram that illustrates certain features of an automated form-filling service, according to an embodiment of the present invention.

Since form filling on a particular site will not work if mapping information is not present in the system, the part of "where to fill" requires the information about the particular site, such as URLs, form names, variable names and the mapping of these variables to the data that a user has already provided. Gathering this data used to be accomplished manually by a mapper who would scan each site, locating each form and mapping the site's variable names with database fields for a user's data. With the use of network effect it is now possible for the system to learn about the site as more and more people fill out forms on the site. FIG. 10 is a flowchart displaying a scheme for this network effect.

Form Filling Process:

The control information (the form names, frame names, variable names, URLs, etc.) obtained from a site must be mapped to a user's data that the system already stores. This data is collected, for example, from members participating in an infomediary Web site program. This means all the controls of the site should be mapped to some common name with which the value in a user's table can be dynamically associated. For example, if the site s has a text field t1, which should be filled with a first name, then there will be an entry in one of the tables for site s and variable t1 mapping value of firstname. The actual firstname value is picked from a user's login table and is associated with the variable t1 by the backend form filling data generator. The following table (Table 1) shows an example list of such mapping identifiers used in one possible embodiment of the system of the present invention. This example is not intended to be limiting, and persons in the art will appreciate from this disclosure that other embodiments and mapping identifiers are possible.

TABLE 1

| Billing mapping | Shipping mapping | Description |
| --- | --- | --- |
| bill:fullname | ship:fullname | Full Name (John Smith) |
| bill:first_name | ship:first_name | First Name (John) |
| bill:middle_name | ship:middle_name | Middle Name (H) |
| bill:last_name | ship:last_name | Last Name (Smith) |
| bill:gender | ship:gender | Male/Female |
| bill:suffix | ship:suffix | Sr |
| bill:email | ship:email | Complete email John@eboodle.com |
| bill:email_domain | Ship:email_domain | Domain part of email (Eboodle.com) |
| bill:email_userid | Ship:email_userid | John |
| bill:company | Ship:company | EBoodle Inc |
| bill:pobox | Ship:pobox | |
| bill:street1 | ship:street1 | 275 Landing Dr |
| bill:street2 | ship:street2 | |
| bill:city | ship:city | Mountain View |
| bill:state:short | ship:state:short | CA |
| bill:state:full | ship:state:full | California |
| bill:state:name_of_the_vendor | ship:state:name_of_the_vendor | CA-California |
| bill:zipcode | ship:zipcode | 94043 |
| bill:province | ship:province | |
| bill:country:name_of_the_vendor | ship:country:name_of_the_vendor | USA-United States |
| bill:country:abbrev | ship:country:abbrev | USA |
| ship:country:full | ship:country:full | United States |
| Bill:country:short | ship:country:short | US |
| bill:local_phone | ship:local_phone | 456-6789 |
| bill:local_phone_plain | ship:local_phone_plain | 4566789 |
| bill:ext_phone | ship:ext_phone | 88888 |
| bill:areacode_phone | ship:areacode_phone | 123 |
| bill:left_phone | ship:left_phone | 123 |
| bill:mid_phone | ship:mid_phone | 456 |
| bill:right_phone | ship:right_phone | 6789 |
| bill:phone_dashes | ship:phone_dashes | 123-456-6789 |
| bill:phone_plain | ship:phone_plain | 1234566789 |
| bill:local_fax_dashes | ship:local_fax_dashes | 456-6789 |
| bill:local_fax_plain | ship:local_fax_plain | 4566789 |
| bill:fax_dashes | ship:fax_dashes | 1234566789 |
| bill:fax_plain | ship:fax_plain | 123-456-6789 |
| bill:left_fax | ship:left_fax | 123 |
| bill:mid_fax | ship:mid_fax | 456 |
| bill:right_fax | ship:right_fax | 6789 |

Entries in columns 1 and 2 represent the keywords used to represent a user's information. These keywords are called 'db_global's. Because these keywords also represent the format information, it is possible that there might be multiple db_globals for single user data. The following tables (Table 2 and 3) list db_globals for different user data formats.

TABLE 2

| | |
|---|---|
| cc:exp:%:mm/yy | 09/00 |
| cc:exp:%:mm/yyyy | 092000 |
| cc:exp:%:mmyy | 0900 |
| cc:month:%:full | September |
| cc:month:%:multi | Sept |
| cc:month:%:short | 09 |
| cc:month:%:single | 9 |
| cc:name:%: | John Smith |
| cc:num:%:cc1 | 4244 |
| cc:num:%:cc2 | 4244 |
| cc:num:%:cc3 | 4244 |
| cc:num:%:cc4 | 4244 |
| cc:num:%:dashes | 4244-4244-4244-4244 |
| cc:num:%:plain | 4244424442444244 |
| cc:num:%:spaces | 4244 4244 4244 4244 |
| cc:year:%:yy | 00 |
| cc:year:%:yyyy | 2000 |
| cc:zip:%: | 94043 |

TABLE 3

| | |
|---|---|
| login:passwd | |
| login:userid | |
| title_prefix | Mr. |
| Name | John Smith |
| Firstname | John |
| Midname | H |
| Lastname | Smith |
| Mother_maiden | Mary |
| Suffix | Sr., Jr. |
| Gender | M/F |
| emailid | John@eboodle.com |
| emailid_domain | Eboodle.com |
| emailid_user | John |
| areacode_eve_phone | 123 |
| ext_eve_phone | 8888 |
| eve_phone_dashes | 123-456-6789 |
| eve_phone_plain | 1234566789 |
| left_eve_phone | 123 |
| mid_eve_phone | 456 |
| right_eve_phone | 6789 |
| local_day_phone | 456-6789 |
| local_day_phone_plain | 4566789 |
| areacode_day_phone | 123 |
| ext_day_phone | 8888 |
| day_phone_dashes | 123-456-6789 |
| day_phone_plain | 1234566789 |
| left_day_phone | 123 |
| mid_day_phone | 456 |
| right_day_phone | 6789 |
| local_eve_phone | 456-6789 |
| Local_eve_phone_plain | 4566789 |
| fax_dashes | 123-456-6789 |
| fax_plain | 1234566789 |
| left_fax | 123 |
| mid_fax | 456 |
| right_fax | 6789 |
| soc_sec_plain | 339956398 |
| soc_sec_dashes | 123-45-6789 |
| soc_sec_left | 123 |
| soc_sec_mid | 45 |
| Soc_sec_right | 6789 |
| fax_dashes | |
| fax_plain | |
| left_fax | |
| mid_fax | |
| right_fax | |
| soc_sec_plain | |
| soc_sec_dashes | |

TABLE 3-continued

| |
|---|
| soc_sec_left |
| soc_sec_mid |
| soc_sec_right |
| soc_sec_right |

BCA Input:

Whenever the BCA identifies a site where form filling information is not available, it sends out the following information to the server. Each parameter corresponds to the variable name on the site.

Var0=Form name:form num:control type:var_name:var-value:seq-control:control # within seq:db_global:description Var1=Form name:form num:control type:var_name:var-value:seq-control:control # within seq:db _global:description

. . .

Seq0=total # of controls in sequence.
Seq1=total # of controls

. . .

The form name is the name of the form on the site's page. The form number is the position of the form with respect to the top of the page. Control type can be text if the variable is an input box, radio for a radio button, and list for a list box. Variable value is what a user enters in that field, sequence control represents the number of groups of variables of a specific type, and control number within a sequence represents the location of the current control in the sequence of controls. In certain situations, depending on some of the keywords on a page, the BCA can identify what the variable corresponds to. In such situations, the db_global field is set to one of the mapping identifiers listed in the above table. Based on the context, the BCA can sometimes get the description associated with a particular control. If the BCA gathers this information, it is sent to the description field. The sequence parameters indicate the number of controls in each group of controls.

EXAMPLE

Consider a page on a vendor site that has two forms f1 and f2 and in f1 there are two text field controls t1, t2 where a user has entered values v1, v2 followed by one radio button r1 with three options r11, r12, r13 and a user has chosen r12, one list box l1 with l11, l12, l13 as three options, a user has picked l13 from the list and in form f2 there is one radio button r1 with two options r21, r22 and a user has chosen r21 followed by one input text box t1 and the value a user entered is v1. The BCA will send Var0=f1:1:text:t1v1:1:1::
Var1=f1:1:text:t2:v2:1:2::
Var2=f1:1:radio:r1:r12;r11;r12;r13:2:1::
Var3=f1:1:list:l1:l13;l11;l12;l13:3:1
Var4=f2:2:radio:r1:r21;r21;r22:1:1
Var5=f2:2:text:t1:v1:2:1
Seq0=2seq1=1 seq2=1 seq3=1 seq4=1

For efficiency, the data is first imported into a database table. The analyzing and mapping of data is then processed by the Type and Learn System in a batch mode.

Figures 11A, 11B:
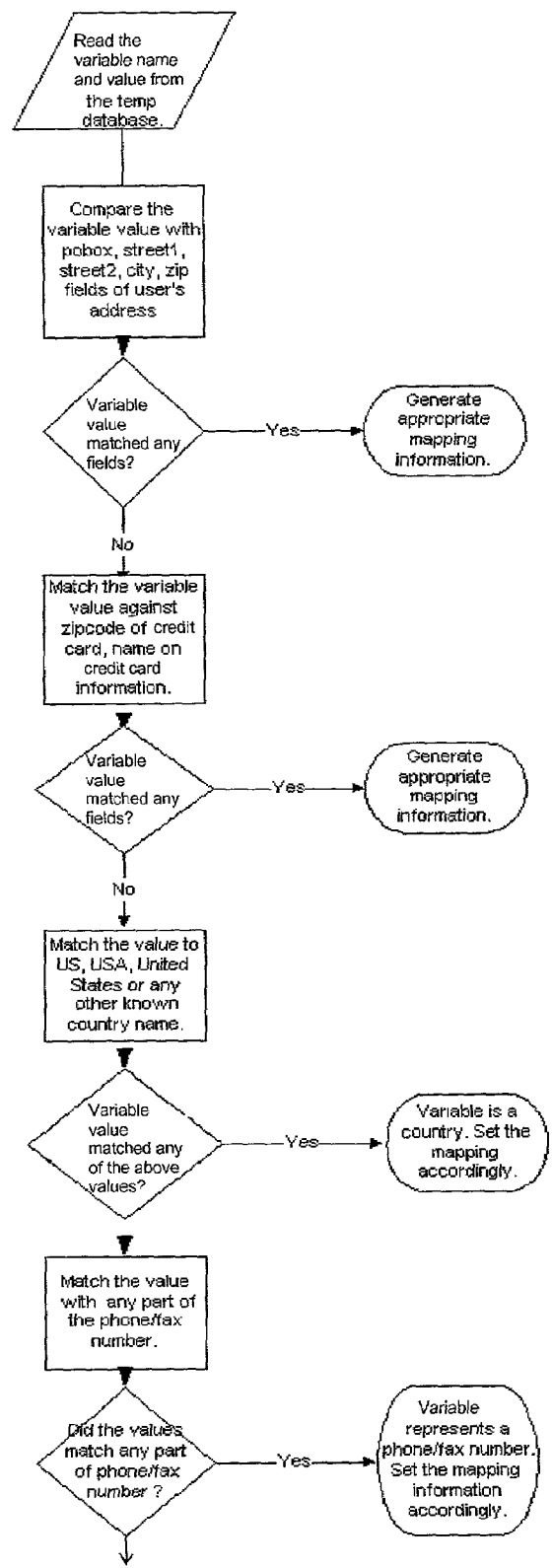
FIGS. 11a-b is a flow chart that illustrates certain features of an automated form-filling service, according to an embodiment of the present invention.
Figure 11B:
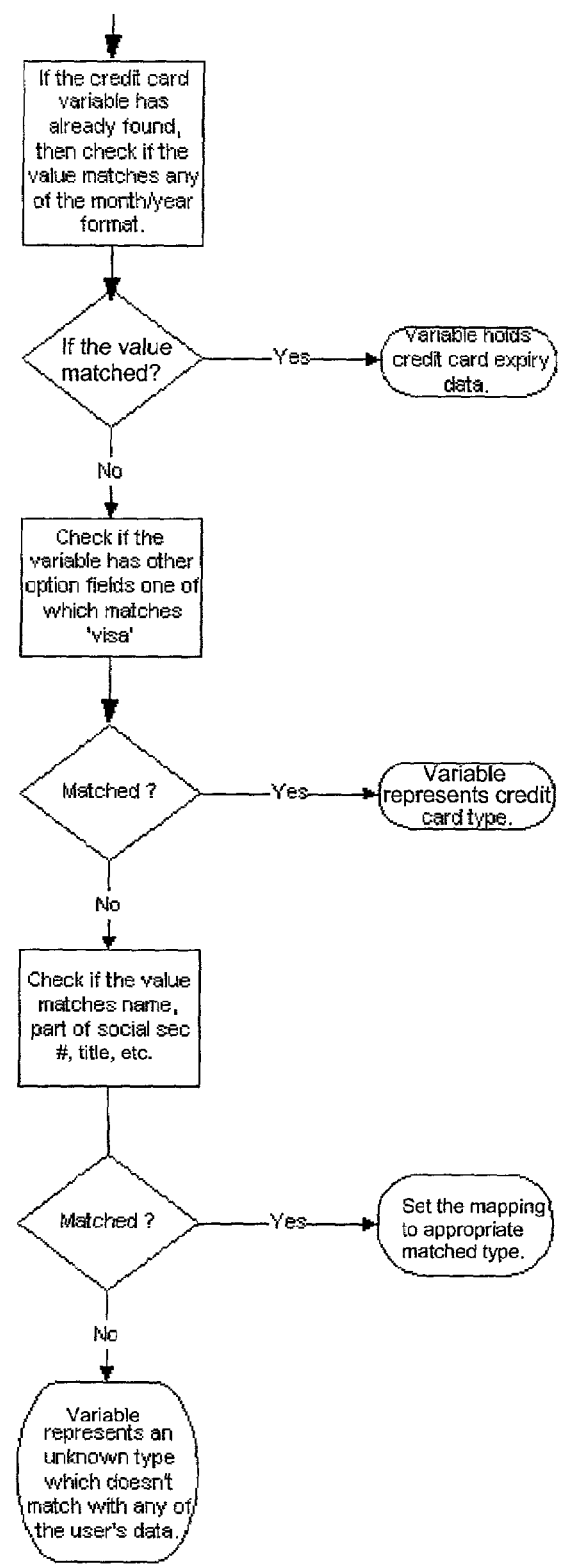

Type and Learn System for Automated Form Filling:

A scheme for another embodiment of automated form filling is shown in FIG. 11. The scheme provides general steps used in an intelligent, automated form filling system to implement the network effect knowledge acquisition of a form's structure. The Type and Learn scheme identifies the mapping information of a given variable name based on the value entered by a user. The variable value is checked against any of the data that is present in a user's address or credit card table. The comparison of the variable value and the actual data in a user's table is not a character-by-character comparison. Instead, controls like phone numbers or fax numbers might be represented as one text box for the entire number or three separate text boxes for area code, middle three digits, final four digits. The system is intelligent enough to check all the possible cases to determine what exactly a given variable represents. For credit card expiration dates, for example, the site may represent the data in a variety of formats: (mm/yy, mm/yyyy, three letter month name and two or four digits of year, etc.) so the system will check all possible combinations to learn the variable type.

Option Controls:

If a particular control is a radio box or a pull down list of items, then the form filling process needs to know all the possible options in that control. For example, credit card type is usually presented as a radio box or a list control on most sites. The BCA should not only gather the particular value that a user selected but also the other option values in that control. In certain circumstances the BCA will make an "intelligent choice" in identifying the type of the control. For example, if a pull down list has 12 items and the first entry is a number 01/1 or "Jan" or "January," the system will deduce it is a date control. If the BCA is able to deduce the type of the control then all the option values are not sent. However, for any other radio/list control the BCA sends all the option values. The Type and Learn' system then analyzes the entire information to determine controls.

Enhancements to the System:

The usefulness of this system depends on how much stored user data matches with the data that is entered into a site's forms. Improvements can be made to the process by applying further fuzzy logic type of comparisons so that some common differences are ignored in the comparison. For example, in a database with user profile information, the street address data may exist as '123 Main Street' while on a site users might enter '123 Main St.' The system may be set to recognize a predetermined degree of matching even though values do not match exactly.

Secondly, the BCA could be intelligent in identifying information about the controls on a page. Because the BCA has access to all the data on a page, it should only collect relevant data and parse it back to the server. This would reduce the amount of data transferred and improve the processing efficiency of the Type and Learn system.

Type and Remember System Example of Automated Form Filling

Figure 12:
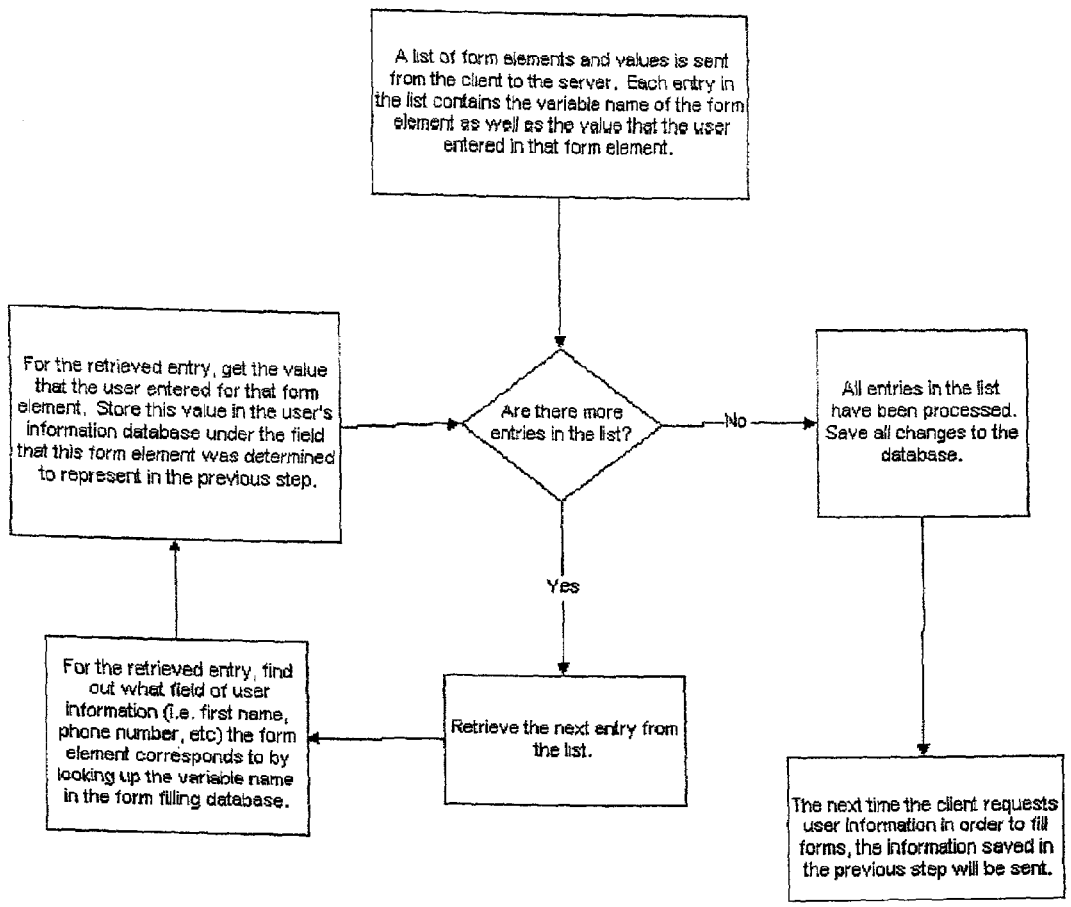
FIGS. 12 is a flow chart that illustrates certain features of an automated form-filling service, according to an embodiment of the present invention.

Type and Remember enables the BCA to process and store user information without the need to maintain user profile data on a remote server, such as the BizRate.com website or other CCS. Instead, when a user fills in a form on a site that has already been mapped by the server, values entered by a user can be stored at that time for retrieval the next time a user needs to fill in a form. Referring to FIG. 12, the server side process is described below:

1. A list of form elements and values is sent from the client to the server. Each entry in the list contains the variable name of the form element and the value that a user entered into that form element.
2. For each element in the list, the form variable name is looked up in the database to identify corresponding user information (i.e. phone number, credit card number, etc.).
3. Once a user information type is determined, the value that a user entered (e.g., 650-555-0819) can be entered in a user's account information database under the column corresponding to that information type (i.e. phone number).
4. After the entire form element list is processed, the changes are saved to the database. The next time the client requests user information to fill forms, the saved information will be sent. This method alleviates a user from ever having to manually enter information at the BizRate.com or another infomediary or central computer web site.

The client browser submits the data as a post to the server in the following format:
vname=<name>&fURL=<URL>&data=<varName: value,varName: value>&addrName1=<name>&addrName2=<name> &CCName=<name>&promptSaveAddrCC={yes,no}

The server looks up each varName in the vendor_map table, and retrieves the db_global value for the varName. A user-entered value for that db_global is entered in a hashtable by the db_global. After all values have been entered, they are extracted from the hashtable one at a time for reentry into the user tables of the database. Different processing actions are taken for each entry, based on the db_global. For instance, if the db_global="first_name", the value that a user entered is simply put in the database in the "first_name" column. However, if the db_global="left_phone", then the values "ship: mid_phone" and "ship:right phone" are also retrieved from the hashtable, and the three entries are concatenated before being entered into the database under the "phone" column. All variables for a given URL are entered on the same row in the database table. If there are two address forms on the same URL, all the "ship" db_globals will be added as one row, and all the "bill" db_globals will be added as a second row. The actions to be taken for each db_global are as follows:

fullname
   Separate the words into and store them in "first_name", "middle_name", and "last_name" in the database.
first_name
   Insert in database under this name.
middle_name
   Insert in database under this name.
last_name
   Insert in database under this name.
email
   Insert in database under this name.
email_domain
   Retrieve email_userid as well, concatenate the two and store under "email" in the database.
email_userid
   Retrieve email_domain as well, concatenate the two and store under "email" in the database.
company
   Insert in database under this name.
pobox
   Insert in database under this name.
street1
   Insert in database under this name.
street2
   Insert in database under this name.
city
   Insert in database under this name.

state:short
   Insert in database under "state".
state:full
   Use the full state map to find the short version of the state name.
   Store this value in the database under "state".
state:name_of_the_vendor
cc:exp:%:mm/yy
   Using the slash, parse out the month and year. Store the month under "cc_exp_mon" and the year under "cc_exp_year".
cc:exp:%:mm/yyyy
   Using the slash, parse out the month and year. Store the month under "cc_exp_mon" and the year under "cc_exp year".
cc:exp:%:mmyy
   Parse out the month and year. Store the month under "cc_exp mon" and the year under "cc_exp_year".
cc:month:%:full
   Store under "cc_exp_mon".
cc:month:%:multi
   Store under "cc_exp_mon".
cc:month:%:short
   Store under "cc_exp mon".
cc:month:%:single
   Store under "cc_exp mon".
cc:name:%:
   Store under "cc_name".
cc:num:%:cc1
   Store under "cc_num1".
cc:num:%:cc2
   Store under "cc_num2".
cc:num:%:cc3
   Store under "cc_num3".
cc:num:%:cc4
   Store under "cc_num4".
cc:num:%:dashes
   Parse using dashes. Store 4 values under "cc_num1" thru "cc_num4".
cc:num:%:plain
   Parse every 4 digits into separate token. Store 4 values under "cc_num1" thru "cc_num4".
cc:num:%:spaces
   Parse using spaces. Store 4 values under "cc_num1" thru "cc_num4".
cc:year:%:yy
   Store under "cc_exp_year".
cc:year:%:yyyy
   Store under "cc_exp_year".
   Use the specific state map for this vendor to find the short version of the state name. Store this value in the database under "state".
zipcode
   Insert in database under this name.
province
   Insert in database under this name.
country:name_of_the_vendor
   Use the specific country map for this vendor to find the short version of the country name. Store this value in the database under "country".
country:abbrev
   Use the abbrev country map to find the full version of this country name. Store this value in the database under "country.
country:full
   Store this in the database under "country".
country:short
   Use the short country map to find the full version of this country name. Store this value in the database under "country"
local_phone
   get left_phone and concatenate that with this value. Store result under "phone".
local_phone_plain
   get left_phone and concatenate that with this value, and add dashes. Store result under "phone".
ext_phone
   Insert in database under this name.
left_phone
   Get mid_phone and right_phone, or local_phone. Concatenate and store under "phone".
mid_phone
   Get left_phone and right_phone. Concatenate and store under "phone".
right_phone
   Get left_phone and mid_phone. Concatenate and store under "phone".
phone_dashes
   Store under "phone".
phone_plain
   Add dashes, then store under "phone".
cc:zip:%:
   Store under "cc_zip".

Type and Learn: Browser Companion Agent Interaction with Sites and Javascripts

Figure 13:
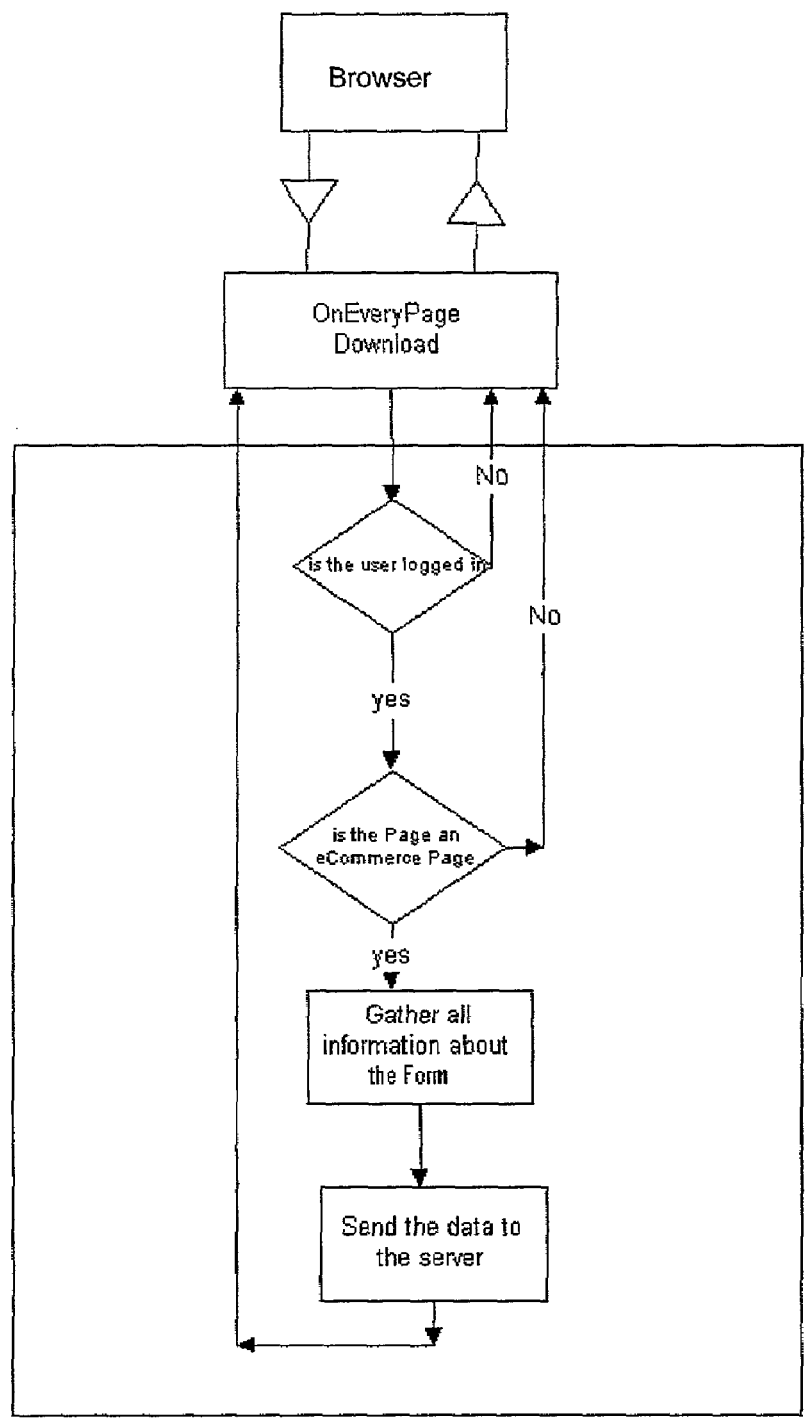
FIGS. 13 is a flow chart that illustrates certain features of an automated form-filling service, according to an embodiment of the present invention.

FIG. 13 is a flow chart showing how the BCA of the present invention interacts with Web sites and JavaScripts. The browser sends "BeforeNavigate complete event" on each page. The BCA then executes the JavaScript. The JavaScript checks if the user is logged in and the page from which the user is navigating is an ecommerce form by scanning for specific keywords in the body text, such as "address", "state", "city", "zip", "visa", "card", "expiration", "date". Once the form is identified as an ecommerce form, the element collection is executed and the data is sent to the server.

Type and Remember for Internet Explorer

Module Description:

The Type and Remember feature captures user information such as address or credit card data and prompts a user to save the data to the server. The stored information can then be retrieved for automatic form filling.

For example, a user navigates to a vendor's Web site. When the user is ready to confirm an order, the user is required to fill out billing and shipping addresses and credit card information. Normally, the BCA can fill this data into the forms automatically if the site is supported and has stored enough user data. If the BCA cannot fill in all or a portion of the form because of insufficient user data, a user will need to type in the remaining fields in the form. In this case, the BCA captures data the user typed in and prompts them to save it. If a user elects to save the data, it sends the data to the server and it is stored in the database.

Note: Depending on the data that a user types in, the dialog prompt can ask a user to save any combination of information. For example, the information could be billing address, shipping address and credit card.

Design:
   Description
      Request a flag from the server to indicate whether to prompt to save user typed in data.

Request the following information from the server to current page:
  Number of billing variables in eBForm attribute.
  Number of shipping variables in eBForm attribute.
  Check user typed in data on every BeforeNavigate2 event if a user logged in.
  Compare user data on the form with the one in domain data object. If either a credit card or street address1 is different, determines whether billing address, shipping address, and/or credit card information has changed.
  Display a prompt dialog that contains checkboxes for saving billing address, shipping address, and/or credit card.
  If a user elects to save, send the following as a packet to the server:
    Domain name, form URL
    List of var names and values
    Billing name, shipping name, and/or credit card name.
  The server determines variables that belong to billing, shipping, or credit card fields and saves them in the proper groups with the new names.

Data Format:
  Receive from the server
    eBPromptSaveAddrCC
      eb_addr
        eBNumBillingVars
        eBNumShippingVars
  Send to server
    Vname=<nam>&fURL=<URL>&data=<varName: value,varName: value&billName=<name&shipName=<name>&CCName=<name>&&promptSaveAddrCC={yes, no}

As should be apparent from the foregoing descriptions of embodiments of the present invention, the BCA of the present invention discussed above enables "plug and play" services:

a. The BCA may run multiple services in a given priority. The priority is set by an individual service. The priority can be set on the server side and hence can be changed whenever required.

b. The services implement common interfaces. All the common features and data are implemented and stored at a level higher than the services. The data is passed to these services.

c. The BCA may be set up to only run those services that are authenticated by using a security code. Authentication is done for security reasons to ensure the data passed to the service is not misused and the service is a genuine service implemented by a company and not hackers.

d. Service components can be individually downloaded on demand. This way, the downloads become light and make a user experience better as to downloading all the code at once.

e. The BCA has auto an update feature, i.e. it can upgrade itself to a newer version on detection. New services may also be easily added to the BCA.

f. With all the above features it becomes much easier to develop and put services in production.

The BCA of the present invention discussed above enables caching techniques of data:

a. A user visits different domains during browsing sessions. The BCA executes the commonly defined interfaces of the services. The services may perform different operations for each page. The architecture allows the services to store data in the collection and retrieve as and when needed.

b. The data for each site is stored in the object collection. In an event when a user goes back to the site in the same session in memory, temporarily cached data is used.

c. The data is stored in data objects and made available to all services. The service share data and hence redundant calls to the server to get the same data are avoided.

d. LRU (Least Recently Used) technique is applied to store data in the collection. The collection stores 'n' number of site data. The threshold 'n' comes from the server and can be changed as needed. LRU technique allows storing data for most frequently visited sites in that session. If a user visits a new site then the data that was not used for the longest time will be replaced by the new site data in the collection.

The BCA of the present invention discussed above enables interactivity between sites:

a. For example, the present invention's architecture facilitates interactivity between, HTML from Web sites, HTML associated with a BCA, BCA service modules, JavaScript and MS Browser object.

b. The need for all components to interact with each other and maintain a level security is important. The HTML in the BCA, which interacts with a user, needs to communicate with main browser. Providing a proxy object does this. The main browser object is made accessible to all the objects in the same process. The JavaScript can access the object using the proxy object. The JavaScript can be the one included in the BCA or any services hosted by the companion.

c. The communication between the CCS site and BCA is made possible using messaging techniques via the proxy. The site action/changes can be communicated to the companion using the messaging.

d. The BCA provides a storing mechanism for all the JavaScript variables as name and value pairs. In this way, as a user navigates from one tab to the other, the state of the variables is not lost.

The foregoing embodiments and features are for illustrative purposes and are not intended to be limiting and persons skilled in the art are capable of appreciating other embodiments from the scope and spirit of the foregoing teachings.

What is claimed:

1. A method for context personal browsing comprising:
providing a remote computer system, the remote computer system receiving data from a client computer system having a browser companion agent including one or more associated service modules that assist a user of the client computer system by providing services that are contextually relevant to a content page on a browser of the client computer system, the data received by the remote computer system being determined according to the content page present on a browser of the client computer system;
automatically determining from the page data at least one set of data or executable code that corresponds to a service module associated with the browser companion agent;
sending the data or code to the browser companion agent for use by a service module;
wherein the data or code sent to the browser companion agent is determined by parsing the page for elements matching elements in a database, the elements in the database corresponding to the code or data to send to the remote computer system;

wherein the browser companion agent determines contextual relevance by coupling to a browser on the client computer system via an application interface; and determining contextual relevance according to changes of the content pages on the browser; and wherein the content page on the browser of the client computer system is received from a content provider system that is not the same as the remote computer system.

2. The method of claim 1 wherein the service module is one or more of a form filling service, a transaction tracking service, and a comparison shopping service.

3. The method of claim 2 wherein the browser companion agent includes at least two of the service modules.

4. The method of claim 1 wherein the data or code sent to the browser companion agent is determined by looking up in a database corresponding code or data to send to the remote computer system.

5. The method of claim 1 wherein the browser companion agent includes one or more of a form filling service module, a transaction tracking service module, and a comparison shopping service module.

6. The method of claim 1 wherein the browser companion agent includes at least two of the service modules.

7. The method of claim 4 wherein the browser companion includes one or more of a form filling service module, a transaction tracking service module, and a comparison shopping service module.

8. The method of claim 4 wherein the browser companion includes at least two of the service modules.

9. The method of claim 1 wherein a data and/or service module comprises a COM object.

10. The method of claim 1 wherein the browser comprises a version of a web browser and the companion agent comprises a browser helper object.

11. The method of claim 1 wherein the data sent to the remote computer system comprises the location identifier for a page on the browser of the client computer system.

12. The method of claim 11 wherein the location identifier comprises a URL for the page.

13. The method of claim 1 wherein the data sent to the remote computer system comprises data about the content on the page on the browser of the client computer system.

14. The method of claim 1 wherein the data sent to the remote computer system comprises data about the structure of the page on the browser of the client computer system.

* * * * *